United States Patent
Armstrong et al.

(10) Patent No.: US 10,559,191 B2
(45) Date of Patent: Feb. 11, 2020

(54) METHOD AND SYSTEM FOR MONITORING AN OBJECT USING A HUB-CLOUD PLATFORM

(71) Applicant: TIONESTA, LLC, San Antonio, TX (US)

(72) Inventors: Nicholas Armstrong, San Antonio, TX (US); Michael Landers, San Antonio, TX (US)

(73) Assignee: TIONESTA, LLC, Austin, TX (US)

( * ) Notice: Subject to any disclaimer, the term of this patent is extended or adjusted under 35 U.S.C. 154(b) by 0 days.

(21) Appl. No.: 15/856,835

(22) Filed: Dec. 28, 2017

(65) Prior Publication Data

US 2019/0206231 A1 Jul. 4, 2019

(51) Int. Cl.
*G08B 25/10* (2006.01)
*H04W 4/029* (2018.01)

(52) U.S. Cl.
CPC ............ *G08B 25/10* (2013.01); *H04W 4/029* (2018.02)

(58) Field of Classification Search
CPC ................................ G08B 25/10; H04W 4/029
See application file for complete search history.

(56) References Cited

U.S. PATENT DOCUMENTS

| 10,075,813 B1 * | 9/2018 | Struhsaker ............ H04W 4/023 |
| 2016/0248847 A1 | 8/2016 | Saxena et al. |
| 2017/0103327 A1 | 4/2017 | Penilla et al. |

OTHER PUBLICATIONS

International Search Report and Written Opinion issued in corresponding PCT Application No. PCT/US2018/058018, dated Feb. 14, 2019 (12 pages).

* cited by examiner

*Primary Examiner* — Nader Bolourchi
(74) *Attorney, Agent, or Firm* — Osha Liang LLP

(57) ABSTRACT

A method for monitoring an object in a geographical area. The method involves obtaining, from a cloud computing device, service provisioning data for a pre-determined service of the object, receiving, from a first plurality of network nodes disposed about a first segment of the geographical area, a plurality of monitored data items, wherein the plurality of monitored data items are generated based on an Internet-of-things (IoT) signal received by the first plurality of network nodes from a tag sensor disposed on the object, and processing, based on the service provisioning data, the plurality of monitored data items to provide the pre-determined service of the object across the first segment of the geographical area.

24 Claims, 15 Drawing Sheets

METHOD AND SYSTEM FOR MONITORING AN OBJECT USING A HUB-CLOUD PLATFORM

BACKGROUND

Availability of the status of various physical assets can be beneficial or even essential. For example, it may be useful to track the location of moving items or persons, for various reasons such as to provide security, to optimize certain operations, e.g., in industrial environments or logistic applications, and/or to provide useful instructions to a tracked person. Further, monitoring stationary objects may also be useful. Such a stationary object may be, for example, a sensor that can be queried to obtain information about the environment surrounding the sensor.

SUMMARY

In general, in one aspect, the invention relates to a method for monitoring an object in a geographical area. The method includes obtaining, from a cloud computing device, service provisioning data for a pre-determined service of the object, receiving, from a first plurality of network nodes disposed about a first segment of the geographical area, a plurality of monitored data items, wherein the plurality of monitored data items are generated based on an Internet-of-things (IoT) signal received by the first plurality of network nodes from a tag sensor disposed on the object, and processing, based on the service provisioning data, the plurality of monitored data items to provide the pre-determined service of the object across the first segment of the geographical area.

In general, in one aspect, the invention relates to a hub device for monitoring an object in a geographical area. The hub device includes a computer processor and memory storing instructions, when executed, causing the computer processor to obtain, from a cloud computing device, service provisioning data for a pre-determined service of the object, receive, from a first plurality of network nodes disposed about a first segment of the geographical area, a plurality of monitored data items, wherein the plurality of monitored data items are generated based on an Internet-of-things (IoT) signal received by the first plurality of network nodes from a tag sensor disposed on the object, and process, based on the service provisioning data, the plurality of monitored data items to provide the pre-determined service of the object across the first segment of the geographical area.

In general, in one aspect, the invention relates to a non-transitory computer readable medium storing instructions for monitoring an object in a geographical area. The instructions, when executed, causing a computer processor to obtain, from a cloud computing device, service provisioning data for a pre-determined service of the object, receive, a plurality of network nodes disposed about a segment of the geographical area, a plurality of monitored data items, wherein the plurality of monitored data items are generated based on an Internet-of-things (IoT) signal received by the plurality of network nodes from a tag sensor disposed on the object, and process, based on the service provisioning data, the plurality of monitored data items to provide the pre-determined service of the object across the segment of the geographical area.

Other aspects of the invention will be apparent from the following description and the appended claims.

DETAILED DESCRIPTION

Figure 1A:
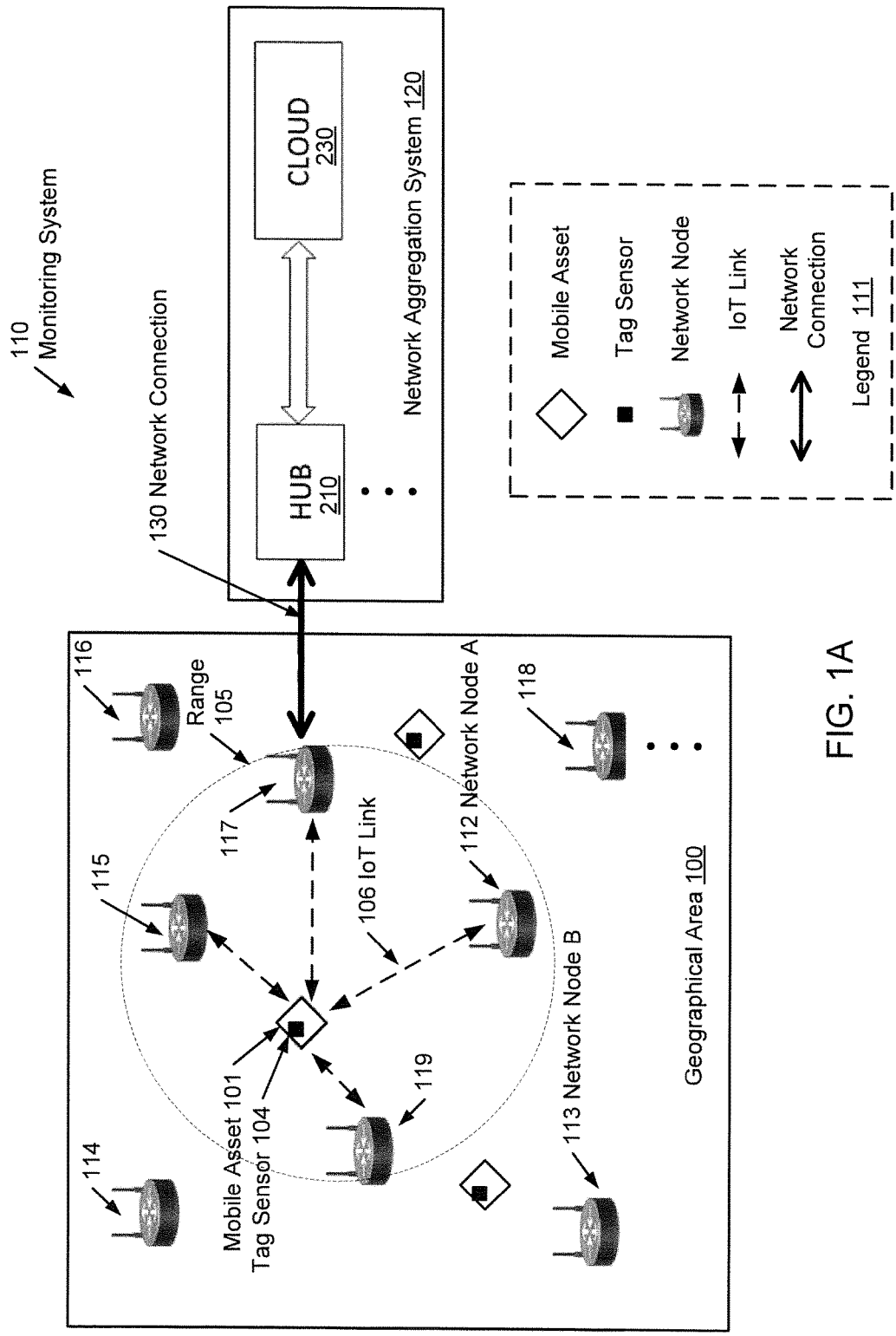
FIG. 1A shows a system for monitoring an object, in accordance with one or more embodiments of the invention.

Specific embodiments of the invention will now be described in detail with reference to the accompanying figures. Like elements in the various figures are denoted by like reference numerals for consistency. Like elements may not be labeled in all figures for the sake of simplicity.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers does not imply or create a particular ordering of the elements or limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1A-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that, one or more of the steps shown in the flowcharts may be omitted, repeated, and/or performed in a different order than the order shown. Accordingly, the scope of the invention should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

In general, embodiments of the invention are directed to methods and systems for monitoring an object in a geographical area. In one or more embodiments of the invention, the object is a mobile asset. In one or more embodiments of the invention, the mobile asset is tagged with a sensor (referred to as a tag sensor) while a number of network nodes (e.g., gateway, access point, etc.) are disposed about the geographical area to receive an Internet-of-things (IoT) signal from the tag sensor. Accordingly, in particular, monitored data items are generated based on the IoT signal received by the network nodes.

In one or more embodiments of the invention, the monitoring system includes a hub and cloud platform where at least one hub is configured to obtain, from a cloud computing device, service provisioning data for a pre-determined service of the mobile asset. The hub is further configured to receive the monitored data items from network nodes disposed about a segment of the geographical area. Accordingly, the hub processes, based on the service provisioning data, the monitored data items to provide the pre-determined service of the mobile asset across the segment of the geographical area.

FIG. 1A shows a monitoring system (110) for monitoring an object, such as one or more mobile assets in a geographical area (100) in accordance with one or more embodiments of the invention. In one or more embodiments, one or more of the modules and elements shown in FIG. 1A may be omitted, repeated, and/or substituted. Accordingly, embodiments of the invention should not be considered limited to the specific arrangements of modules shown in FIG. 1A.

As shown in FIG. 1A, depicted according to the legend (111), the monitoring system (110) includes a number of network nodes (e.g., network node A (112), network node B (113), network nodes (114-119)) disposed about the geographical area (100) and in communication with a network aggregation system (120). In one or more embodiments of the invention, the network nodes (e.g., network node A (112), network node B (113), network nodes (114-119)) are stationery within the geographical area (100). For example, the network nodes may be placed at respective stationery locations within the geographical area (100) at time of deployment and remain at the deployed known locations unless subsequently re-deployed. In one or more embodiments of the invention, the mobile assets (e.g., mobile asset (101)) may include livestock, mobile mining equipment, human subjects, vehicles, agriculture, oil and gas assets such as tanks, or any other valuable mobile objects that may move from time to time within the geographical area (100). In one or more embodiments, other types of objects different from mobile assets may also be monitored within the geographical area (100) without departing from the scope of the invention. For example, the moisture content of soil (i.e., monitored object) may be monitored within the geographical area (100). In other embodiments, a water trough sensor may be employed to monitor a water level. Correspondingly, the geographical area (100) may include a ranch, a mining field, a playground, a dealership lot or port, a refinery, or any other suitable public or private space in which assets are mobile and may be tracked.

In one or more embodiments, each mobile asset (e.g., mobile asset (101)) is equipped with a tag sensor (e.g., tag sensor (104)) that communicates with multiple network nodes (e.g., network node A (112)) via Internet of Things (IoT) links (e.g., IoT link (106)) to enable monitoring of the mobile assets (e.g., mobile asset (101)). For example, the tag sensor (104) may measure physiological parameters of the mobile asset (101) for sending to nearby network nodes (e.g., network node A (112)) using the IoT links (e.g., IoT link (106)). In one or more embodiments, each IoT link (e.g., IoT link (106)) is established and/or effective within certain range of a tag sensor (e.g., range (105) of tag sensor (104)). For example, four IoT links (e.g., IoT link (106)) are shown as established between the tag sensor (104) and four network nodes (e.g., network node A (112)). In contrast, other network nodes (e.g., network node B (113)) outside of the range (105) of the tag sensor (104) are not in communication with the tag sensor (104) using any IoT link. For example, no IoT link is established between the tag sensor (104) and the network node B (113). From time to time, the range (105) may vary depending on various conditions such as location of the mobile asset (101), weather/terrain of the geographical area (100), battery charge of the tag sensor (104), etc. For example, the range (105) may vary at certain time points such that the network node A (112) falls outside of the range (105). During these time points, only three IoT links remain established and/or effective between the tag sensor (104) and the remaining three network nodes.

In one or more embodiments, the network nodes (e.g., network node A (112), network node B (113), network nodes (114-119)) disposed about the geographic area (100) communicate with each other via a wireless network. For example, the distance between the network nodes (e.g., network node A (112), network node B (113), network nodes (114-119)) may be on the order of 1 kilometer (km) and may vary with the nature of terrain in the geographic area (200). The wireless network may be based on the WiFi communication spectrum at 2.4 GHz and 5 GHz. For example, 802.11S standard may be used to allow the network nodes (e.g., network node A (112), network node B (113), network nodes (114-119)) to communicate with each other as a full meshed network. The meshed network enables communications based on the availability of any network node (e.g., network node A (112), network node B (113), network nodes (114-119)) to pass a signal through the network to its destination, such as from the network node A (112) to the network aggregation system (120). In one or more embodiments, the meshed network across the geographical area (100), or a portion thereof, is connected to the network aggregation system (120) via a primary network node to reduce communication bandwidth demand to the network aggregation system (120). For example, the primary network node may aggregate data transmissions from the meshed network before passing on to the network aggregation system (120). As shown in FIG. 1A, the network node (117) acts as the primary network node for the meshed network deployed across the geographical area (100). In addition to or in place of the 802.11S standard, any communication technology supporting full meshed networking may also be used.

In one or more embodiments, one or more network nodes (e.g., network node A (112), network node B (113), network nodes (114-119)) may be configured as a gateway, a wireless access point, or a combination thereof. The gateway is a network node for interfacing with another network that uses different protocols. The wireless access point, or generally referred to as the access point, is a networking device that allows WiFi connection to a computer or communication network. Further details of the network nodes (e.g., network node A (112)) are described in reference to FIGS. 2A-2B below.

In one or more embodiments of the invention, the network nodes (e.g., network node A (112)) and the network aggregation system (120) described above collectively perform the functionalities of the monitoring system (110) using the method described in reference to FIGS. 4A-4E below.

Figure 1C:
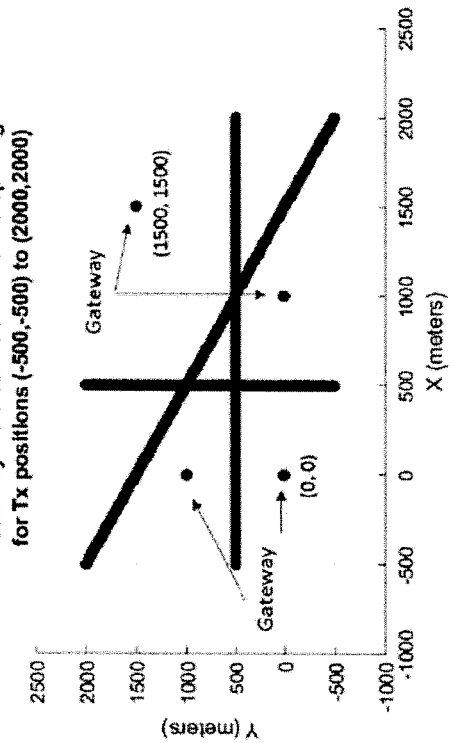
FIGS. 1B, 1C, and 1D show a model for monitoring an object, in accordance with one or more embodiments of the invention.
Figure 1D:
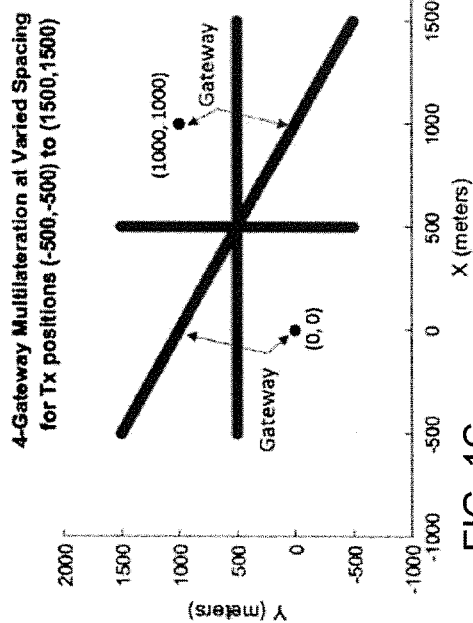
Figure 1B:
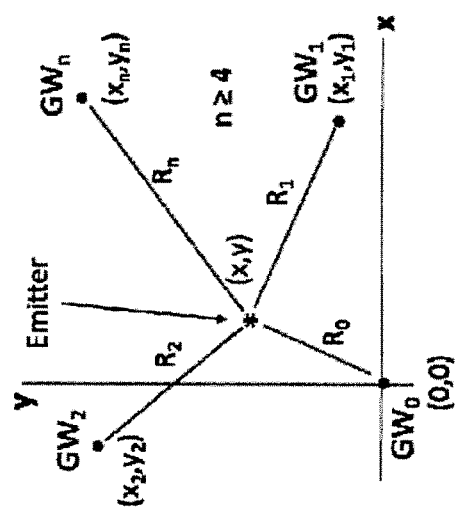

FIGS. 1B, 1C, and 1D show a model for a TDOA localization technique, in accordance with one or more embodiments of the invention. As shown in FIGS. 1B, 1C, and 1D, gateways are used to represent the network nodes depicted in FIG. 1A above. Specifically, FIG. 1B shows four gateways in an x-y plane, denoted as $GW_0$, $GW_1$, $GW_2$, and $GW_n$ to represent the four network nodes (e.g., network nodes A (112)) within the range (105), as shown in FIG. 1A above. The model described below is based on placing $GW_0$ at the origin, (0,0), of the x-y coordinate system. The other gateways, $GW_1$, $GW_2$ through $GW_n$, may be located in respective known locations $(x_1, y_1), (x_2, y_2), \ldots (x_n, y_n)$. As an example, the distance between the gateways may be nominally 1 to 2 kilometers. In one or more embodiments, the gateways, $GW_0$ through $GW_n$ are stationery. In other words, the known locations $(0,0), (x_1, y_1), (x_2, y_2), \ldots (x_n, y_n)$ do not change with time. In one or more embodiments, the gateways, $GW_0$ through $GW_n$ may change locations. For example, the known locations $(x_1, y_1), (x_2, y_2), \ldots (x_n, y_n)$ may be determined using GPS included in each gateway.

The emitter depicted in FIG. 1B represents the tag sensor (104) depicted in FIG. 1A above and has a particular location, (x,y), with the distances between the emitter and the corresponding gateways denoted as $R_0$, $R_1$, $R_2$ and $R_3$.

The distance between the Gateway j and the emitter is $$R_j = \sqrt[2]{(x_j - x)^2 + (y_j - y)^2} \text{ for } j = 0, 1, 2, \ldots n \text{ where } n \geq 4$$

Note that for $$j = 0, R_0 = \sqrt[2]{x^2 + y^2}$$

since this gateway is located at the origin of the coordinate system.

Now square $R_j$ and expand the terms within the radical to obtain:

$$R_j^2 = x_j^2 - 2x_j x + x^2 + y_j^2 - 2y_j y + y^2$$

Since $R_0^2 = x^2 + y^2$, $R_0^2$ may be subtracted from each side of the above expression and obtain:

$$R_j^2 - R_0^2 = x_j^2 - 2x_j x + y_j^2 - 2y_j y \qquad \text{Equation 1}$$

Note that this expression is now linear in x and y. This linearity is used to develop a pair of simultaneous equations in two unknowns, x and y. In this context, the model described herein may be referred to as a linear algebraic model.

The transmitted signal travels from the emitter (i.e., tag sensor (104)) to each gateway at the speed of light, $c=3*10^8$ m/sec. The corresponding time-of-arrival, TOA, at each gateway is:

$$T_j = R_j/c$$

Use the TOA, $T_0$, of the gateway at the origin as a reference and take the difference with TOAs of the remaining gateways and the reference to generate time-difference-of-arrivals, $\tau_j$:

$$\tau_j = T_j - T_0 = R_j/c - R_0/c$$

Solve for $R_j$ and square it to obtain:

$$R_j^2 = (c\tau_j)^2 + 2c\tau_j R_0 + R_0^2 \text{ or}$$

$$(R_j^2 - R_0^2)/c\tau_j = c\tau_j + 2R_0$$

For j=1, 2 . . . n, the $2R_0$ may be eliminated by taking the following differences and expressing the differences relative to the TDOAs or:

$$(R_2^2 - R_0^2)/c\tau_2 - (R_1^2 - R_0^2)/c\tau_1 = c\tau_2 - c\tau_1$$

.

.

.

$$(R_n^2 - R_0^2)/c\tau_n - (R_1^2 - R_0^2)/c\tau_1 = c\tau_n - c\tau_1$$

Use Equation 1 above and substitute the corresponding values of x's and y's terms for $(R_1^2 - R_0^2)$, $(R_2^2 - R_0^2)$ through $(R_n^2 - R_0^2)$, then collect the terms to form n–1 equations that are linear in x and y:

$$A_2 x + B_2 y = D_2$$
$$\vdots$$
$$A_n x + B_n y = D_n$$

where $$A_2 = -\frac{2x_2}{c\tau_2} + \frac{2x_1}{c\tau_1}$$
$$\vdots$$
$$A_n = -\frac{2x_n}{c\tau_n} + \frac{2x_1}{c\tau_1}$$

$$B_2 = -\frac{2y_2}{c\tau_2} + \frac{2y_1}{c\tau_1}$$
$$\vdots$$
$$B_n = -\frac{2y_n}{c\tau_n} + \frac{2y_1}{c\tau_1}$$

$$D_2 = c\tau_2 - c\tau_1 - \frac{x_2^2 + y_2^2}{c\tau_2} + \frac{x_1^2 + y_1^2}{c\tau_1}$$
$$\vdots$$
$$D_n = c\tau_n - c\tau_1 - \frac{x_n^2 + y_n^2}{c\tau_n} + \frac{x_1^2 + y_1^2}{c\tau_1}$$

Express the n−1 equations above in a matrix format:

$$(AB)\begin{pmatrix}x\\y\end{pmatrix} = (D) \quad \text{Equation 2}$$

where $$(AB) = \begin{pmatrix}A_2 & B_2\\ \vdots & \vdots \\ A_n & B_n\end{pmatrix} \text{ and } (D) = \begin{pmatrix}D_2\\ \vdots \\ D_n\end{pmatrix}$$

Equation 2 may be solved for x and y (i.e., coordinates for the location of the emitter or tag sensor (104)), as a function of known gateway locations, using a pseudoinverse matrix approach which is similar to a least squares solution:

$$(_y{}^x) = \text{inv}((AB)T(AB)) * (AB)^{T} * (D)$$

where $(AB)^T$ is the transpose of (AB).

The simultaneous equations above may exhibit a singularity if an emitter is located along a line that bisects the baseline between a pair of gateways. The singularity is a result of the distances between the emitter on the bisector and the pair of gateways being equal. FIGS. 1C and 1D show how the singularities vary with gateway locations. FIG. 1C has gateway locations at the corners of a 1 kilometer square. The darkened lines show the locations of the singularities. In other words, each point on the darkened lines corresponds to a singularity. Note that a singularity does not appear along a line that goes through the origin and the gateway located at (1000, 1000) meters since the algebraic approach uses the origin as the reference for all of the time difference. FIG. 1D shows how the singularities associated with the diagonally slopped line changes as the one gateway was moved to a different location (1500, 1500).

Generally, the issue caused by the singularity is a low probability event. If more than four gateways receive the IoT signal from the emitter or tag sensor (104), using different combinations of receiving geometries mitigates the likelihood of a singularity. The use of TOA and RSSI measurements in combination allows for selecting which of the four gateways are used to geolocate an emitter without being influenced by any singularity.

Figure 1E:
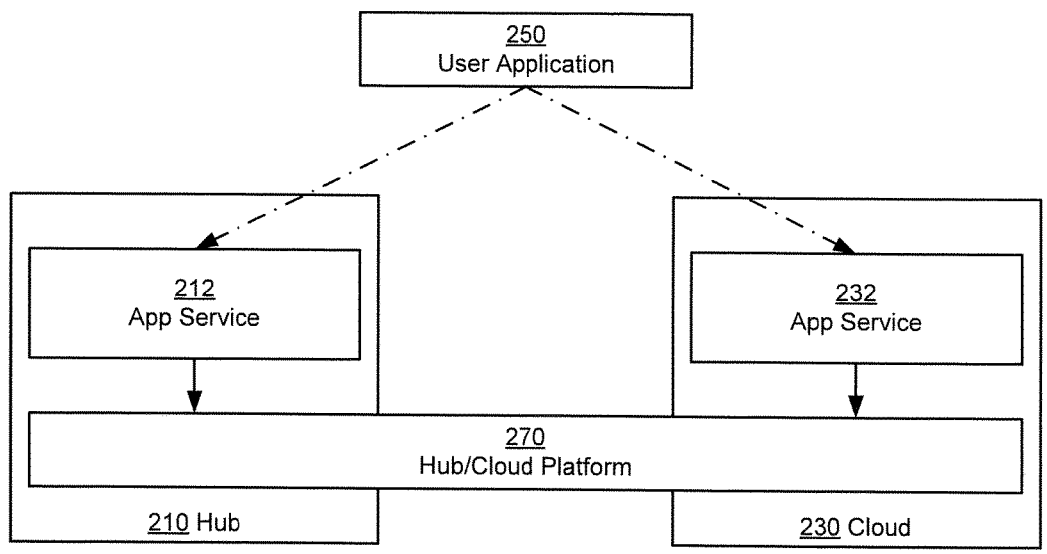
FIGS. 1E, 1F, and 1G show a hub-cloud platform for monitoring an object, in accordance with one or more embodiments of the invention.
Figure 1F:
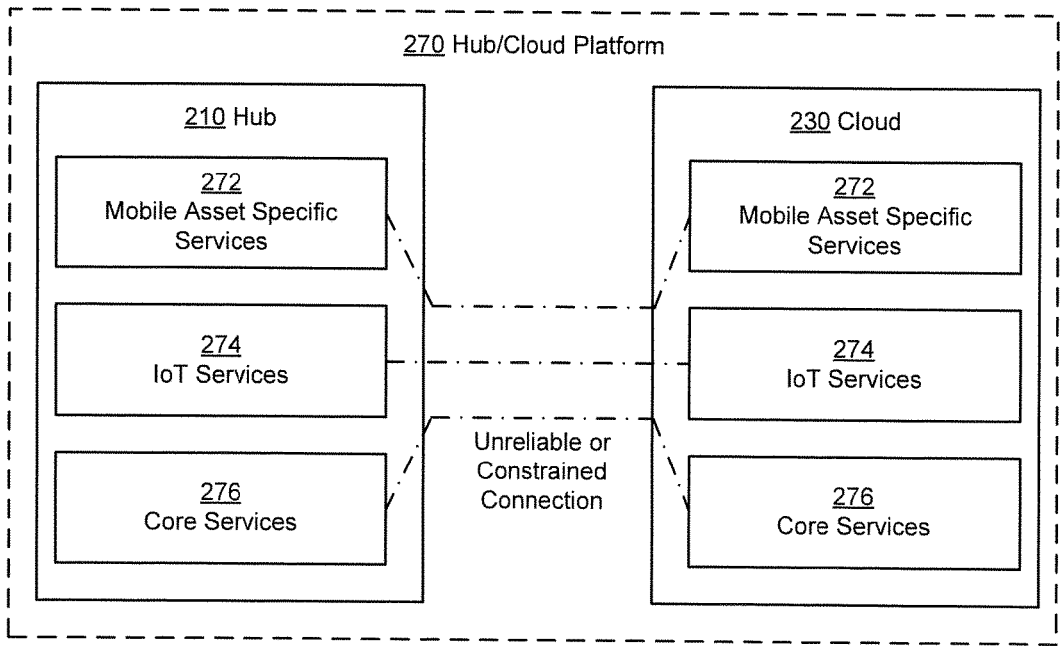
Figure 1G:
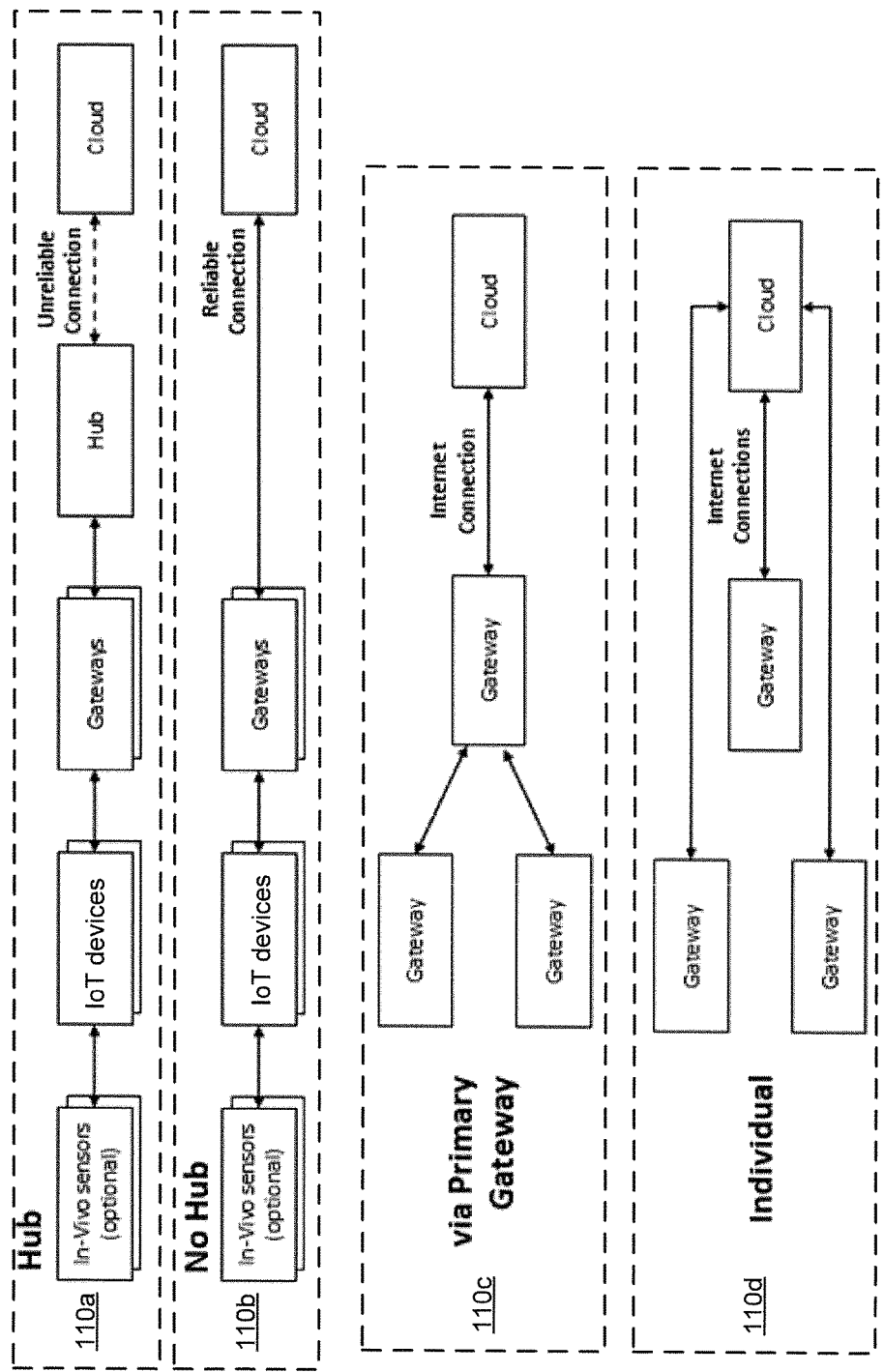

FIGS. 1E, 1F, and 1G show a hub-cloud platform for monitoring an object, in accordance with one or more embodiments of the invention. Specifically, FIG. 1E shows a hub-cloud configuration of a system for monitoring the mobile asset. The hub-cloud configuration includes the hub (210), the cloud (230), and the user application (250). A hub-cloud platform (270), jointly executing on the hub (270) and in the cloud (230) in a distributed manner, provides back end-support for various components of the monitoring system (110) depicted in FIG. 1A above, as further described with reference to FIG. 1F. A user application (250) may be relied upon by a user to access the hub-cloud platform (270) via the hub (210) and/or via the cloud (230). Each of these components is subsequently described.

Services, made available through the hub-cloud platform (270) may include, for example, providing data, gathered by the monitoring system (110), to the user, enabling the user to configure the monitoring system, etc. The hub-cloud platform (270) may be accessed by a user using the user application (250), which may be executing on a computing device such as a smartphone or a laptop. The user application (250), thus, may provide a user interface configured to enable the user to access the hub-cloud platform, and to receive notifications on critical events. The user application may include for example, alert displays, status messages, data visualization capabilities, control and configuration capabilities, etc. The user application may further provide data entry fields (e.g., to configure the monitoring system), specialized control interfaces (e.g., to control a drone), voice over IP (VoIP) and/or push to talk interfaces and other communication interfaces that are supported by the broadband links provided by the access points. Alternative implementations of the user application (250) may operate on other devices, e.g., on an audio alert device.

Depending on whether the user application (250) accesses the hub-cloud platform (270) via the hub (210) or via the cloud (230), the user application (250) may interface with the hub-cloud platform via the app service (212) of the hub (210) (e.g., using a smartphone's Wi-Fi interface) or via the app service (232) of the cloud (230) (e.g., using the smartphone's LTE interface). When a user is on-site, e.g., directly connected to an access point using a Wi-Fi link, accessing the hub-cloud platform (270) may be particularly low-latency because the interaction of the user's computing device with the hub is local.

The hub (210), includes a computing device configured to perform at least some of the steps described with reference to the flowcharts of FIGS. 4A-4E, and one or more communication interfaces that enable the hub to interface with one or more network nodes, the cloud (230), and the computing device that executes the user application (250). The computing device of the hub may be, for example, an embedded system that includes all components of the computing device on a single printed circuit board (PCB), or a system on a chip (SOC), i.e., an integrated circuit (IC) that integrates all components of the computing device into a single chip. The computing device may include one or more processor cores, associated memory (e.g., random access memory (RAM), cache memory, flash memory, etc.), one or more network interfaces (e.g., an Ethernet interface, a Wi-Fi interface, a Bluetooth interface, etc.), and interfaces to storage devices, input and output devices, etc. The computing device may further include one or more storage device(s) (e.g., a hard disk, an optical drive such as a compact disk (CD) drive or digital versatile disk (DVD) drive, flash memory, etc.), and numerous other elements and functionalities. In one embodiment of the invention, the computing device includes an operating system that may include functionality to execute the methods further described below. Those skilled in the art will appreciate that the invention is not limited to the aforementioned configuration of the computing device.

The cloud (230), in accordance with one or more embodiments of the invention, may be formed by multiple/many networked computing devices. These computing devices may be geographically and organizationally distributed in any way. For example, some of these computing devices may be located in a data center, whereas other such computing devices may be individual physical or virtual servers. An exemplary computing system, as it may be used in the cloud, is shown in FIG. 6. One or more of the computing devices may host the hub-cloud platform (270), analogous to how the hub-cloud platform is hosted on the hub (210). While the components of the hub-cloud platform that are executing on the hub (210) and that are executing on a computing device in the cloud (230) may operate separately, they are interconnected, e.g. via backhaul link(s) described in reference to FIG. 5A below, thus enabling synchronization between these components. Accordingly, the same information may be available, regardless of whether the user application connects via the hub (210) or via the cloud (230).

As depicted in the monitoring system (110a) in FIG. 1G below, temporary discrepancies may exist, e.g., during times when the backhaul link is unreliable or interrupted, and a synchronization is therefore unavailable. Further, because additional, e.g., more complex, data processing may be performed in the cloud, additional data, resulting from the additional processing, may be available when connecting to the hub-cloud platform (270) via the cloud. Such data may, however, also be available via the hub (210), if they are synchronized to the hub (210) via the backhaul link(s). The cloud may run multiple instances of the hub-cloud platform in order to support the load of many sites and/or many users. Depending on the configuration of the hub-cloud platform, incoming data, i.e., data received from a particular hub, a particular device, a particular site, or a particular customer, may be distributed between multiple instances, or may be consistently assigned to the same instance, using, e.g., a consistent hash ring configuration.

Those skilled in the art will recognize that other configurations that deviate from the configuration introduced in FIG. 1E may exist, without departing from the invention. For example, in monitoring systems (110) that do not include an interface to the cloud (230), the hub-cloud platform (270) may solely execute on the hub. In such a scenario, the hub is configured to "self-backhaul", i.e., the hub may collect and consolidate sensor data and may perform some or even all of the processing that would otherwise be performed in the cloud. Similarly, in monitoring systems (e.g., monitoring systems (110b), (110c), (110d), as depicted in FIG. 1G below) in which the network nodes directly interface with the cloud (230), the hub-cloud platform (270) may solely execute in the cloud. All functionality, even functionally that would typically be provided by the hub, in this case may be provided in the cloud. The configuration of the monitoring system, with or without hub, in one or more embodiments of the invention, may be transparent, i.e., sensors or other devices may operate in the same manner, regardless of the presence of a hub. Similarly, a user may experience the same monitoring system, whether the hub is present or not.

Turning to FIG. 1F, additional details of the hub-cloud platform (270) are shown. In one or more embodiments of the invention, the hub-cloud platform is organized in layers. Core services (276) provide basic functionalities such as data storage, network, and messaging. On top of the core services (276), the IoT services (274) provide services that are specific to IoT networks, but that are not necessarily specific to a particular application, such as the use in an agricultural environment. The IoT services, may thus include, for example, location services (e.g., GPS, TDOA or RSSI based), IoT network services and configurations, etc. The topmost layer includes mobile asset specific services (272), such as agricultural service. For example, the agricultural service may include behavioral analytics that are used to monitor the well-being of the livestock. Additional application-specific layers may be added, without departing from the invention.

These services, in accordance with one or more embodiments of the invention, may be available through the hub (210) and/or through the cloud (230). A synchronization may be performed between the services executing in the cloud and the services executing on the hub, thus maintaining consistency between the hub and the cloud. As long as a communication link (e.g., backhaul link) is available, the data available through the hub and through the cloud may be identical. However, if the communication link temporarily becomes unavailable, data that are accumulated on the hub may not be available through the cloud. A synchronization may be performed once the communication link is restored, to update the cloud with the data available on the hub. Accordingly, a consistent data view is available via hub and cloud, in accordance with one or more embodiments of the invention. In one or more embodiments, the consistent view is a prioritized consistent view when certain data may be more important than others, as identified by associated metadata. On a slower communication link (e.g., slower than a pre-determined speed threshold), the hub may organize data to ensure that more important data (e.g., identified by an importance measure contained in the metadata) is synchronized first. Similarly, the hub may exclude certain data that is not relevant (e.g., identified by the importance measure contained in the metadata) from being synchronized to the cloud. From time to time, the hub may receive a configuration from the cloud indicating certain data as unimportant at the particular time. Accordingly, the importance measure contained in the metadata may be adjusted in response.

Figure 2:
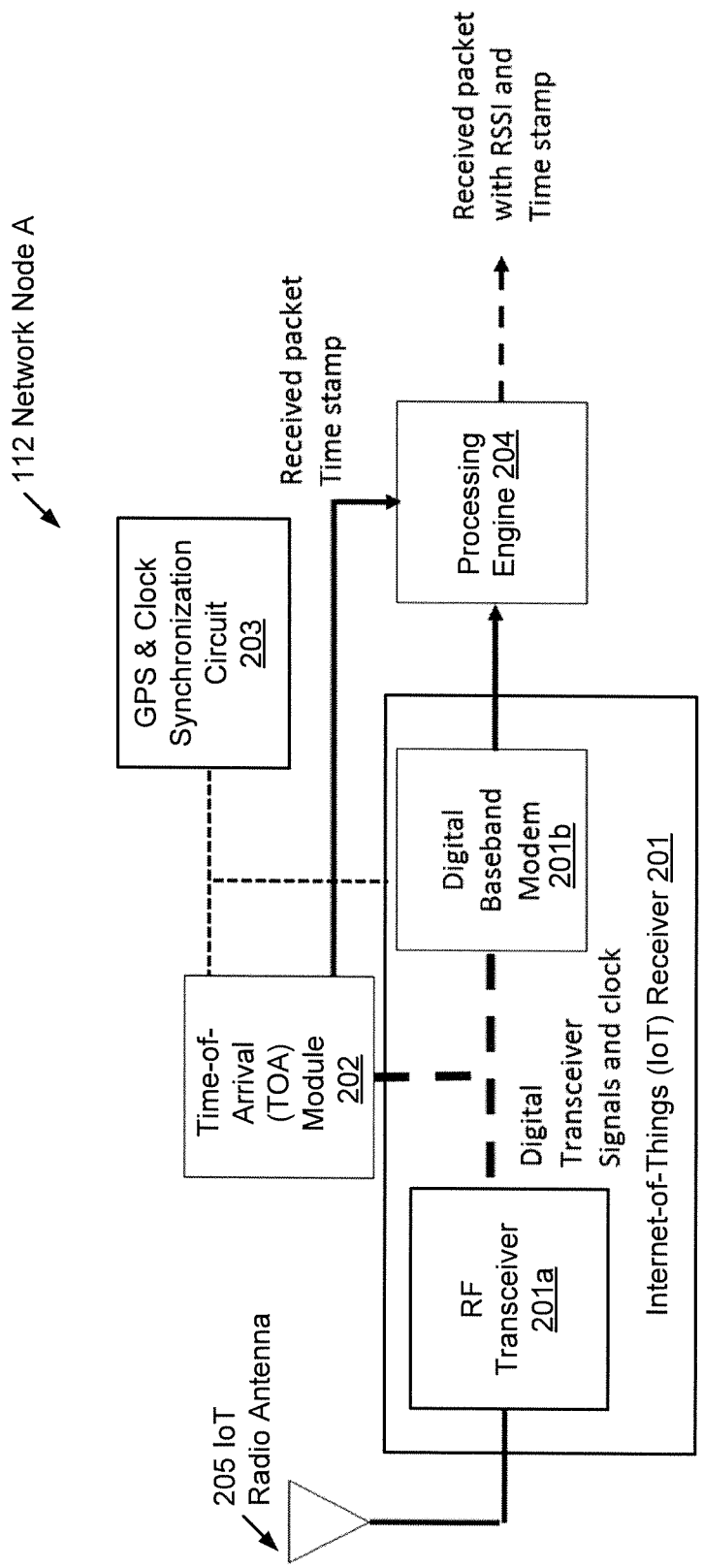
FIGS. 2 and 3 show a network node and communication protocol overlay for monitoring an object, in accordance with one or more embodiments of the invention.

FIG. 2 shows a network node for monitoring one or more mobile assets in a geographical area in accordance with one or more embodiments of the invention. In one or more embodiments, one or more of the modules and elements shown in FIG. 2 may be omitted, repeated, and/or substituted. Accordingly, embodiments of the invention should not be considered limited to the specific arrangements of modules shown in FIG. 2.

As shown in FIG. 2, the network node A (112) includes an Internet-of-things (IoT) receiver (201), a time-of-arrival (TOA) module (202), a global positioning service (GPS) & clock synchronization circuit (203), a processing engine (204), and an IoT radio antenna (205). Each of the modules and elements of the network node A (112) may include a hardware component, a software component, or a combination of hardware and software components that performs the function of the network node A (112). In one or more embodiments, the IoT receiver (201) is configured to receive an IoT signal from a tag sensor disposed on a mobile asset, such as the tag sensor (104) of the mobile asset (101) depicted in FIG. 1A above. The IoT receiver (201) includes an RF receiver (201a) to receive the IoT signal via the IoT radio antenna (205), and a digital baseband modem (201b) to demodulate or otherwise convert the received IoT signal into a digitized signal having a preamble and a payload. The preamble includes metadata of the payload information, such as identifying information of the tag sensor, transmission time stamp of the IoT signal, etc. The payload includes information generated by the tag sensor, such as physiological measurements of the mobile asset, GPS position of the tag sensor, etc. For example, the IoT receiver (201) may be based on the LoRA protocol or other types of IoT protocols. In other words, the RF receiver (201a) is a radio frequency receiver configured to receive the LoRA or other types of IoT signal. The digital baseband modem (201b) is a modulator/demodulator circuit configured to process the LoRA or other types of IoT signal.

In one or more embodiments, the received IoT signal is detected by the TOA module (202) to generate a TOA time stamp without demodulating or otherwise decoding the waveform of the IoT signal. In one or more embodiments, the received IoT signal is detected by the TOA module (202) to generate the TOA time stamp based on the preamble without decoding the payload of the IoT signal. The TOA time stamp is a numerical value representing the time when the IoT signal is detected by the TOA module (202). In one or more embodiments, the TOA module (202) generates the TOA time stamp based on a high precision and stable internal clock. In one or more embodiments, the internal clock is calibrated by and synchronized to a 1 PPS (pulse-per-second) time mark from the GPS & clock synchronization circuit (203). For example, a temperature stabilized disciplined oscillator at 32 MHz with less than 10 ns RMS (root-mean-squared) jitter may be used to supply the internal clock. In another example, the 1 PPS time mark may be provided to a phased lock loop (PLL) circuit which generates 32 MHz frequency with less than 10 ns of RMS jitter.

In on or more embodiments, the processing engine (204) is configured to decode the converted IoT signal that includes sensor measurements generated by the tag sensor, GPS position of the tag sensor, and signal statistics such as received signal strength indication (RSSI). The processing engine (204) is further configured to send the decoded IoT payload information and RSSI along with the TOA time stamp information through the meshed network to the network aggregation system (120) depicted in FIG. 1A above.

In on or more embodiments, the processing engine (204) is further configured to support the generation and transmission of simulated IoT signals. The simulated IoT signal is a signal conforming to the same protocol as the IoT signal from the tag sensors (e.g., tag sensor (104)). In contrast to the IoT signal, the simulated IoT signal is generated by a network node (e.g., network node A (112)) using associated processing engine (e.g., processing engine (204)) instead of being generated by any tag sensor. In one or more embodiments, the simulated IoT signal of the network node A (112) includes a GPS position of the network node A (112) such that the network node A (112) acts as a simulated mobile asset for diagnostic testing and calibration of the monitoring network (110). As used herein, a simulated mobile asset is a network node that generates and transmits a simulated IoT signal to act as a mobile asset having a tag sensor transmitting a real IoT signal.

In on or more embodiments, the GPS & clock synchronization circuit (203) includes a GPS unit serving at least two functions. The GPS unit provides a long-term and accurate measurement of geo-position of the network node A (112). This measured geo-position does not require the network node A (112) to be located precisely during the deployment of the monitoring network (110). Secondly, the GPS signal provides the 1 PPS timing reference that synchronizes internal clocks in the network nodes (e.g., network node A (112), network node B (113), network nodes (114-119)) throughout the monitoring network (110). The internal clock is used to generate the TOA time stamps noted above. Synchronization of the network node internal clocks throughout the monitoring network (110) allows the TOA time stamps generated by different network nodes (e.g., network node A (112), network node B (113), network nodes (114-119)) to be compared on a synchronized or otherwise consistent basis.

In on or more embodiments, the GPS & clock synchronization circuit (203) further includes a signal conditioning circuit that synchronizes the GPS 1 PPS timing pulse with a stable internal clock of the network node A (112). This stable internal clock is used by the TOA module (202) to generate the TOA time stamp. It is sufficiently stable that during times that the GPS signal may not be available, this internal clock continues to provide synchronized timing to generate the TOA time stamps.

In one or more embodiments of the invention, the components of the network node A (112) described above collectively perform the functionalities of the monitoring system (110) using the method described in reference to FIGS. 4A-4E below.

Figure 3:
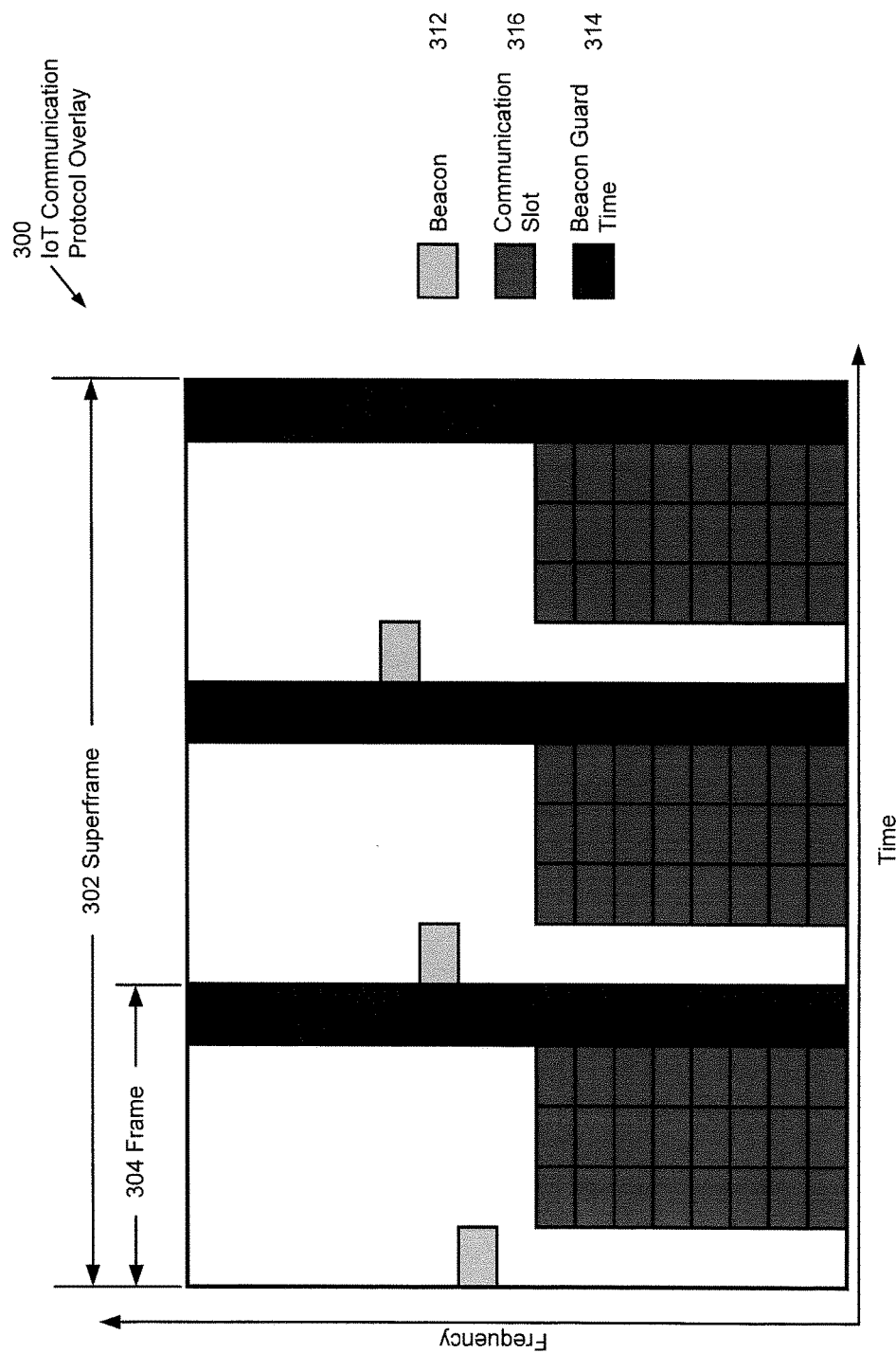

FIG. 3 shows an IoT communication protocol overlay (300) for monitoring one or more mobile assets in a geographical area in accordance with one or more embodiments of the invention. In one or more embodiments, one or more of the modules and elements shown in FIG. 3 may be omitted, repeated, and/or substituted. Accordingly, embodiments of the invention should not be considered limited to the specific arrangements of modules shown in FIG. 3.

As shown in FIG. 3, the IoT communication protocol overlay (300) is designed to enable the distribution of an accurate time base by an access point (e.g., network node A (112) depicted in FIGS. 1 and 2A above) to tag sensors or other devices communicating with the access point. The IoT communication protocol overlay (300) further establishes rules for data exchanges in the form of frequency bands and time slots to be used for communications, to reduce or eliminate collisions that may otherwise occur when multiple tag sensors attempt to simultaneously transmit data. In one or more embodiments, the aforementioned IoT signal and simulated IoT signal are based on the IoT communication protocol overlay (300) described herein.

In one or more embodiments of the invention, the IoT communication protocol overlay (300) may be used to extend existing IoT protocols such as LoRa or SigFox, but also other protocols such as the 802.11 Wi-Fi protocol. The IoT communication protocol overlay (300) includes a superframe (302) and frames (304). The beginning of each frame is marked by a beacon (312), emitted by the access point. A beacon may include or may be followed by a communication of various data to the IoT devices within the range of the access point. The data may include a precise time base that the access point may have obtained from its GPS unit. The data may further include a specification of the IoT communication protocol overlay, thus informing the IoT devices that are supposed to communicate with the access point of the timing and frequency of time slots assigned to them for data transmission.

The beacon may then be followed by transmissions of sensor data in the communication slots (316). Each communication slot may be of a fixed duration and may be located at a set frequency. In the exemplary IoT communication protocol overlay (600) of FIG. 3, a frame includes 24 communication slots. Groups of 8 communication slots may be simultaneously transmitted using different frequencies. Communication slots may be assigned in any way. For example, a communication by a particular IoT device may be performed using a single assigned communication slot or, if necessary, multiple communication slots that may occur in parallel at different frequencies (channels) and/or subsequently. No communication slot may be assigned to multiple devices to prevent communication collisions. A frame (x04) ends with a beacon guard time (x14), during which no communications by any of the IoT devices that rely on the IoT communication protocol overlay may be allowed. However, other IoT devices that are merely capable of communicating using the underlying IoT communication protocol, but not the IoT communication protocol overlay, may communicate during the beacon guard time.

In total, the IoT communication protocol overlay (600) provides 72 communication slots (316). Accordingly, up to 72 individual communications may be performed in a single superframe (302). If these 72 communications are insufficient to serve all IoT devices, the protocol overlay may be modified in various ways without departing from the invention. For example, a superframe may be configured to include more than three frames. Additionally or alternatively, a frame may include more than three consecutive communication slots, and/or additional frequencies (channels) may be used to allow simultaneous transmission of additional communication slots. The same IoT communication protocol overlay may be used by all access points across a site.

In one or more embodiments of the invention, not all channels that are available in the underlying IoT communication protocol are used by the IoT communication protocol overlay. Channels that are not made available may be used to support devices that are not designed to work with the IoT communication protocol overlay, while being able to use the underlying IoT protocols. Such channels may also be used for lengthy transmissions such as a firmware provided over the air.

Returning to the discussion of FIG. 1A, in one or more embodiments, the network nodes (e.g., network node A (112)) interface with a network aggregation system (120), which performs processing of the data received from the monitored mobile assets (e.g., mobile asset (101)) via the network nodes (e.g., network node A (112), network node B (113), network nodes (114-119)). For example, the network aggregation system (120) may process the received data to determine location, behavior, and/or physiology of each mobile asset (e.g., mobile asset (101)), as further described below.

In one or more embodiments of the invention, the network aggregation system (120) includes a processing hub (210) and an information cloud (230). The hub (210) and cloud (230) collectively aggregate the TOA time stamps from multiple network nodes (e.g., network node A (112)) to geolocate the mobile asset tagged with the tag sensor based on time-difference-of-arrival (TDOA) techniques, such as the linear algebraic model described in reference to FIGS. 1B-1D above. Note that the TOA time stamps from a minimum of three network nodes may be used to geolocate a tag sensor emitting the IoT signal. The TOA time stamps from four or more network nodes is preferred to enable the use of the aforementioned linear algebraic model to calculate the tag sensor location.

In one or more embodiments, the hub (210) interfaces with computing devices in the cloud (230) via a wired backhaul uplink, a cellular backhaul uplink and/or a satellite backhaul uplink of the Internet. The hub (210), includes a computing device configured to perform at least some of the steps described with reference to the flowcharts of FIGS. 4A-4E, and one or more communication interfaces that enable the hub to interface with one or more access points (e.g., network node A (112), network node B (113), network nodes (114-119)), the cloud (230), and a user computing device that executes a user application. The computing device of the hub may be, for example, an embedded system that includes all components of the computing device on a single printed circuit board (PCB), or a system on a chip (SOC), i.e., an integrated circuit (IC) that integrates all components of the computing device into a single chip. The computing device may include one or more processor cores, associated memory (e.g., random access memory (RAM), cache memory, flash memory, etc.), one or more network interfaces (e.g., an Ethernet interface, a Wi-Fi interface, a Bluetooth interface, etc.), and interfaces to storage devices, input and output devices, etc. The computing device may further include one or more storage device(s) (e.g., a hard disk, an optical drive such as a compact disk (CD) drive or digital versatile disk (DVD) drive, flash memory, etc.), and numerous other elements and functionalities. In one embodiment of the invention, the computing device includes an operating system that may include functionality to execute the methods further described below. Those skilled in the art will appreciate that the invention is not limited to the aforementioned configuration of the computing device.

The cloud (230), in accordance with one or more embodiments of the invention, may be formed by multiple/many networked computing devices. These computing devices may be geographically and organizationally distributed in any way. For example, some of these computing devices may be located in a data center, whereas other such computing devices may be individual physical or virtual servers. An exemplary computing system, as it may be used in the cloud, is shown in FIG. 6. While functionalities of the network aggregation system (110) that are performed on the hub (210) and that are performed on a computing device in the cloud (230) may be performed separately, the hub (210) and cloud (230) are interconnected, e.g., via the backhaul link, thus enabling synchronization between functionalities performed on the hub (210) and functionalities performed on a computing device in the cloud (230). Accordingly, the same information may be available, regardless of whether a user application connects via the hub (210) or via the cloud (230). Temporary discrepancies may exist though, e.g., during times when a backhaul link is interrupted, and a synchronization is therefore unavailable. Further, because additional, e.g., more complex, data processing may be performed in the cloud, additional data, resulting from the additional processing, may be available when connecting to the cloud. Such data may, however, also be available via the hub (210), if they are synchronized to the hub (210) via the backhaul link.

Those skilled in the art will recognize that other configurations that deviate from the hub-cloud configuration depicted in FIG. 1A may exist, without departing from the invention. For example, in the monitoring system (110) that does not include an interface to the cloud (230), the functionality of the network aggregation system (120) may be performed solely on the hub (210). In such a scenario, the hub is configured to "self-backhaul", i.e., the hub may collect and consolidate sensor data and may perform some or even all of the processing that would otherwise be performed in the cloud. Similarly, in the monitoring system (110) in which the access points directly interface with the cloud (230), the functionality of the network aggregation system (120) may be performed solely in the cloud. All functionality, even functionally that would typically be provided by the hub, in this case may be provided in the cloud. The configuration of the monitoring system (110), with or without hub, in one or more embodiments of the invention, may be transparent, i.e., sensors or other devices may operate in the same manner, regardless of the presence of a hub. Similarly, a user may experience the same monitoring system, whether the hub is present or not. In one or more embodiments of the invention, the hub (210) and/or the cloud (230) perform the functionalities of the monitoring system (110), in particular of the network aggregation system (120), using the method described in reference to FIGS. 4A-4E below.

FIGS. 4A-4E shows a method flowchart for monitoring one or more mobile assets in a geographical area, in accordance with one or more embodiments of the invention. The process shown in FIGS. 4A-4E may be executed, for example, by one or more components discussed above in reference to FIGS. 1-3. One or more steps shown in FIGS. 4A-4E may be omitted, repeated, and/or performed in a different order among different embodiments of the invention. Accordingly, embodiments of the invention should not be considered limited to the specific number and arrangement of steps shown in FIGS. 4A-4E.

The method flowchart depicted in FIGS. 4A-4E may be used, for example, to track the location and/or physiological signals obtained from the mobile assets. The method flowchart may be executed repeatedly over time, thus enabling a user to continuously monitor the mobile assets and to detect changes, e.g., when the mobile assets move.

Figure 4A:
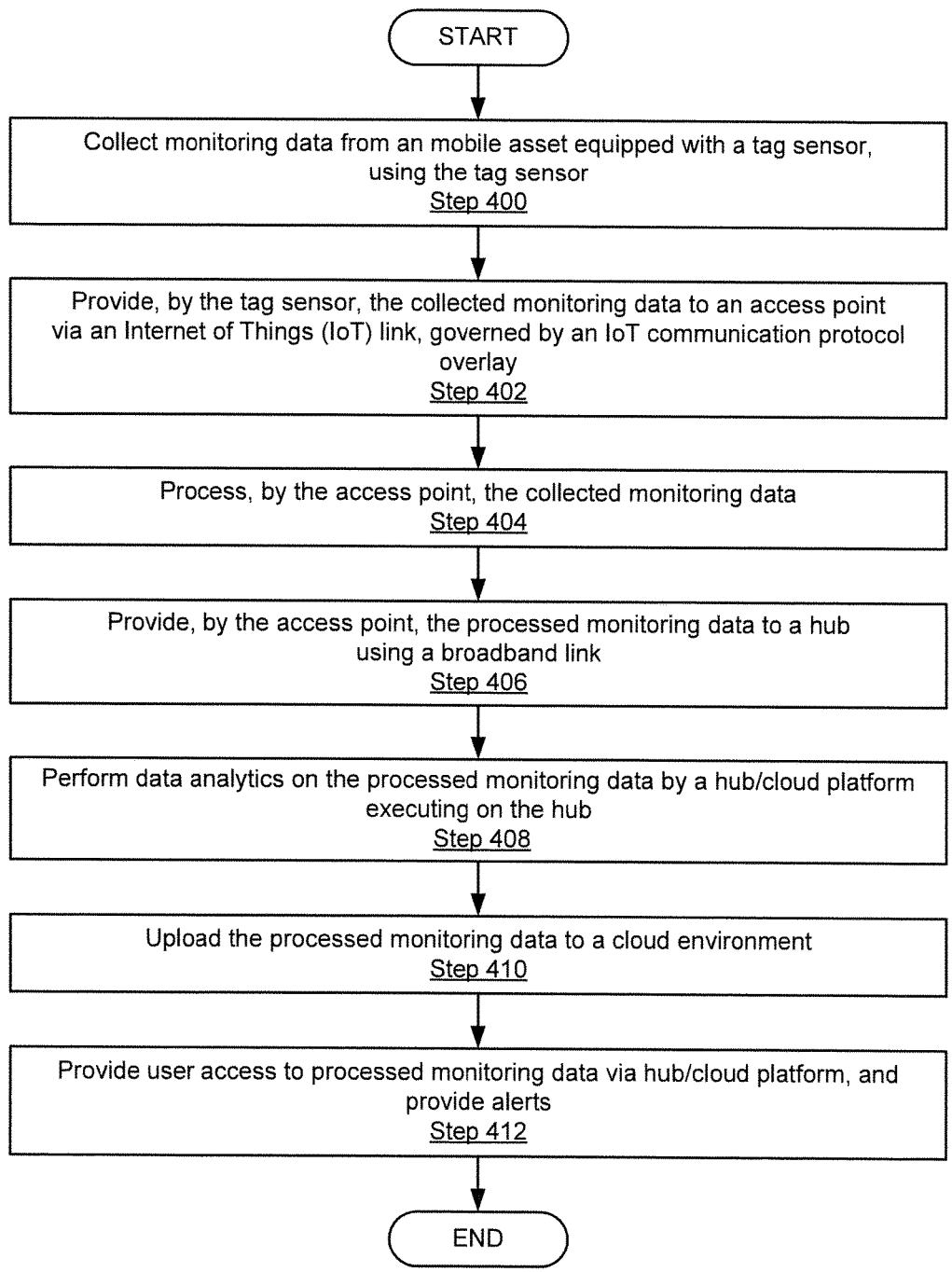
FIGS. 4A, 4B, 4C, 4D, and 4E show flowcharts of a method for monitoring an object, in accordance with one or more embodiments of the invention.

FIG. 4A shows a general method flow chart for monitoring one or more mobile assets in a geographical area. Initially in Step 400, monitoring data is collected from the mobile assets that are equipped with tag sensors. The collection may occur as scheduled, e.g., based on the timebase provided by the IoT communication protocol overlay or spontaneously, e.g., upon request or when a particular event is detected. The data collection by one tag sensor may be independent from the data collection by other tag sensors. The collected data may be buffered by the tag sensor until it can be transmitted to an access point.

In Step 402, the tag sensors provide the collected data to one or more network nodes (e.g., access points, gateways, etc.), using the IoT link. Each tag sensor uses a communication slot at a particular time and in a particular frequency band, as specified by the IoT communication protocol overlay, thus avoiding transmission interference by multiple tag sensors using the same communication slot. The transmissions of the tag sensors may be received by one or more network nodes within range.

In Step 404, the received data may be processed by the network node(s) that received the data. The processing may include aggregating, filtering, fusing, compressing and/or encrypting the data. The processing may further include the exchange of data with other access points. For example, TDOA data may be exchanged between network nodes to determine a location of a tag sensor, relative to the network nodes.

In Step 406, the processed data are provided to a hub, using the broadband link that interfaces the network node(s) and the hub. Step 406 is optional and is executed only if a hub exists in the used system configuration. If no hub exists, the processed data may alternatively be provided to the cloud. Regardless of whether the system is configured to use a hub, a cloud or both, the processed data is received by the hub-cloud application which is executing on the hub, in the cloud, or on the hub and in the cloud.

In Step 408, data analytics are performed by the application executing on the hub. The data analytics may include modules that are generic to a variety of applications such as location tracking, and other modules that are specific to a particular application, such as monitoring animals' physiological parameters. The data analytics may additionally or alternatively be performed in the cloud.

In Step 410, the processed monitoring data is stored on the hub or uploaded to the cloud. This step may be performed in systems that include a cloud environment and in systems that include a combination of the hub and the cloud. Accordingly, data obtained from the tag sensors may be equally accessible via the cloud and via the hub. In one or more embodiments, the hub transforms the data prior to storing locally or uploading to the cloud. For example, the hub may convert GPS signals into geographical coordinates, such as to implement hybrid GPS. In another example, the transformation may include grouping data, adding metadata, (e.g., TDOA timestamps, resolved TDOA locations, marking with the received network segment, etc.).

In Step 412, a user is provided access to the processed monitoring data using a hub-cloud application that is executing on the hub, in the cloud, or on the hub and in the cloud. The user may access the processed monitoring data using any type of computing device that is capable of interfacing with the hub-cloud application. The user may obtain a visualization of the processed monitoring data, which may include text, graphics, charts, etc. The user may access a time history of the processed monitoring data and may further also access the unprocessed or partially processed data obtained from the tag sensors. Alerts may be provided to the user under certain configurable conditions. For example, an alert may be provided if a mobile asset (e.g., animal) is leaving a particular area, if unusual movement patterns (such as no movement, indicating, for example, sickness, or excessive motion, indicating, for example, a predator) are detected, of if physiological measurements are beyond a specified range.

Figure 4B:
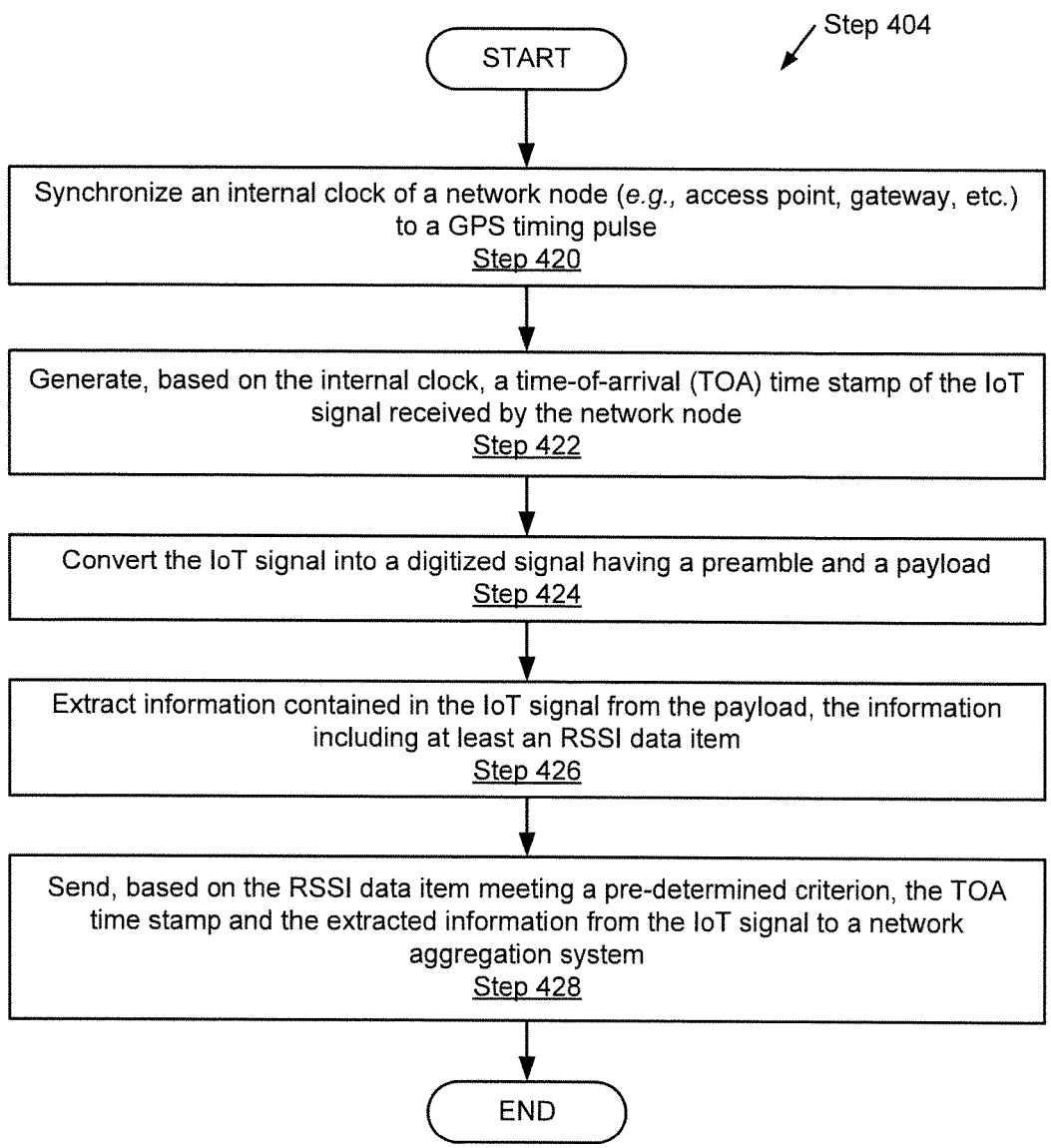

FIG. 4B shows details of Step 404, depicted in FIG. 4A above, that is performed by a network node. Initially, in Step 420, an internal clock of a network node (e.g., access point, gateway, etc.) is synchronized to a GPS timing pulse when the GPS timing pulse is available and received by the network node during at least a first time period. In response to the synchronizing, the internal clock is maintained to a pre-determined stability level throughout at least a second time period when the GPS timing pulse is unavailable and not received by the network node. In this manner, the GPS timing pulse is used to synchronize multiple network nodes of the monitoring system.

In Step 422, a time-of-arrival (TOA) time stamp of the IoT signal received by the network node is generated based on the internal clock of the network node. In one or more embodiments, the IoT signal of a single tag sensor is received by multiple network nodes that generate respective TOA time stamps based on respective internal clocks that are synchronized using the aforementioned GPS timing pulse.

In Step 424, the IoT signal is converted into a digitized signal having a preamble and a payload. In one or more embodiments, the TOA time stamp is generated based on detecting the IoT signal prior to the IoT signal being converted. In one or more embodiments, the TOA time stamp is generated based on the preamble without decoding the payload.

In Step 426, information contained in the IoT signal is extracted from the payload. In one or more embodiments, the information includes one or more of a received-signal-strength-indication (RSSI) data item, a global positioning system (GPS) position of the tag sensor, and other monitored parameters of the mobile asset. For example, the monitored parameters may include physiological parameters. In particular, the GPS position is embedded in the IoT signal by the tag sensor when GPS signal is available and received by the tag sensor.

In Step 428, the TOA time stamp and the extracted information form the IoT signal is sent to a network aggregation system. In one or more embodiments, one or more of the TOA time stamp, RSSI data item, GPS position of the tag sensor, and monitored parameters are sent to the network aggregation system via the meshed network formed by the network nodes of the monitoring system. In particular, each network node in the meshed network may relay the extracted information sent from another network node to the network aggregation system via an ad-hoc network path of the meshed network.

In one or more embodiments, sending TOA time stamp is based on the RSSI data item meeting a pre-determined criterion, which indicates acceptable quality of the received IoT signal. In other words, the network node determines that the RSSI data item meets a pre-determined criterion, indicating acceptable IoT signal quality, prior to sending the TOA time stamp to the network aggregation system. If the RSSI data item of the IoT signal does not meet the pre-determined criterion, indicating unacceptable IoT signal quality, the TOA time stamp of the IoT signal is prevented from being sent to the network aggregation system.

Figure 4C:
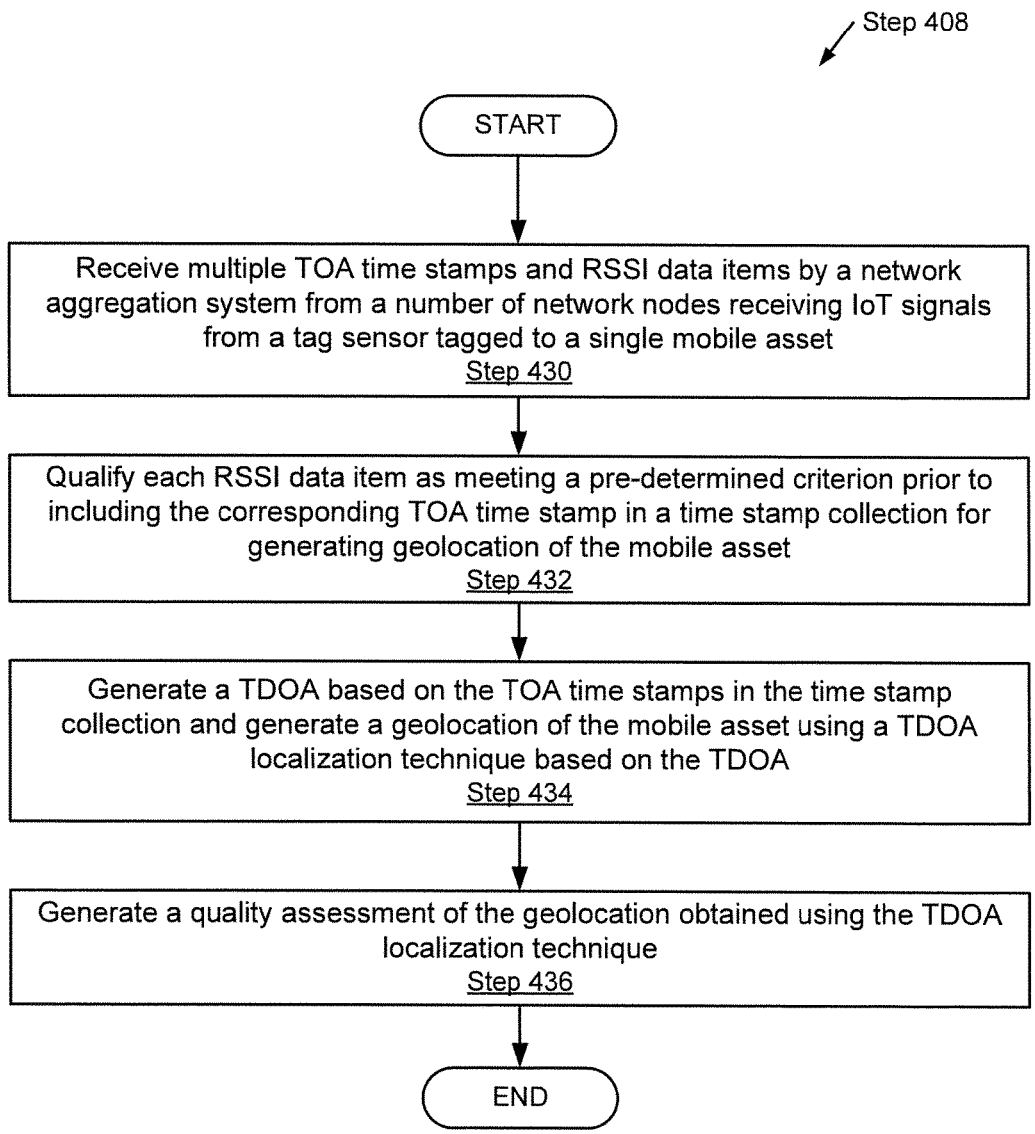

FIG. 4C shows details of Step 408, depicted in FIG. 4A above, that is performed by the network aggregation system. Initially in Step 430, multiple TOA time stamps and RSSI data items are received by a network aggregation system from a number of network nodes with known locations. In particular, the TOA time stamps and RSSI data items are generated by the network nodes from IoT signals transmitted from a tag sensor tagged to a single mobile asset. In one or more embodiments, at least one network node also transmits a GPS position of the tag sensor along with the TOA time stamp and RSSI data item. In particular, GPS position is generated by the tag sensor when a GPS signal is available and received by the tag sensor.

In Step 432, each RSSI data item is determined by the network aggregation system as meeting a pre-determined criterion, indicating acceptable quality of the received IoT signal, prior to including the corresponding TOA time stamp in a time stamp collection for generating the geolocation.

In Step 434, a geolocation of the mobile asset is generated by the network aggregation system based at least on the TOA time stamps in the time stamp collection. In one or more embodiments, the TOA time stamps in the time stamp collection are compared to each other to generate a time-difference-of-arrival (TDOA). Accordingly, the geolocation is generated from the TDOA using a pre-determined TDOA localization technique, such as based on the model described in reference to FIGS. 1B, 1C, and 1D above.

In Step 436, a quality assessment of the geolocation, generated using the TDOA localization technique, is generated. In one or more embodiments, a supplemental geolocation of the mobile asset is generated based on the RSSI data items using a pre-determined RSSI localization technique. In particular, the supplemental geolocation refers to a different calculation of geolocation to supplement the geolocation calculated using the TDOA localization technique. If the geolocation and the supplemental geolocation match each other within a pre-determined range, the geolocation generated using the TDOA localization technique is qualified. In other words, the quality assessment is positive or is assigned a higher rating. In contrast, if the difference between the geolocation and the supplemental geolocation exceeds the pre-determined range, the geolocation generated using the TDOA localization technique is disqualified. In other words, the quality assessment is negative or is assigned a lower rating.

In one or more embodiments, the GPS position of the tag sensor, when available, and the geolocation, generated using the TDOA localization technique, of the mobile asset are compared to further generate the quality assessment of monitoring the mobile asset. If the GPS position of the tag sensor, when available, and the geolocation generated using the TDOA localization technique match each other within a pre-determined range, the geolocation generated using the TDOA localization technique is qualified. In other words, the quality assessment is positive or is assigned a higher rating. In contrast, if the difference between the GPS position of the tag sensor, when available, and the geolocation generated using the TDOA localization technique exceeds the pre-determined range, the geolocation generated using the TDOA localization technique is disqualified. In other words, the quality assessment is negative or is assigned a lower rating. In one or more embodiments, if the geolocation generated using the TDOA localization technique is disqualified, the GPS position of the tag sensor, when available, and/or the supplemental geolocation generated using the predetermined RSSI localization technique are sent to the network aggregation system.

Figure 4D:
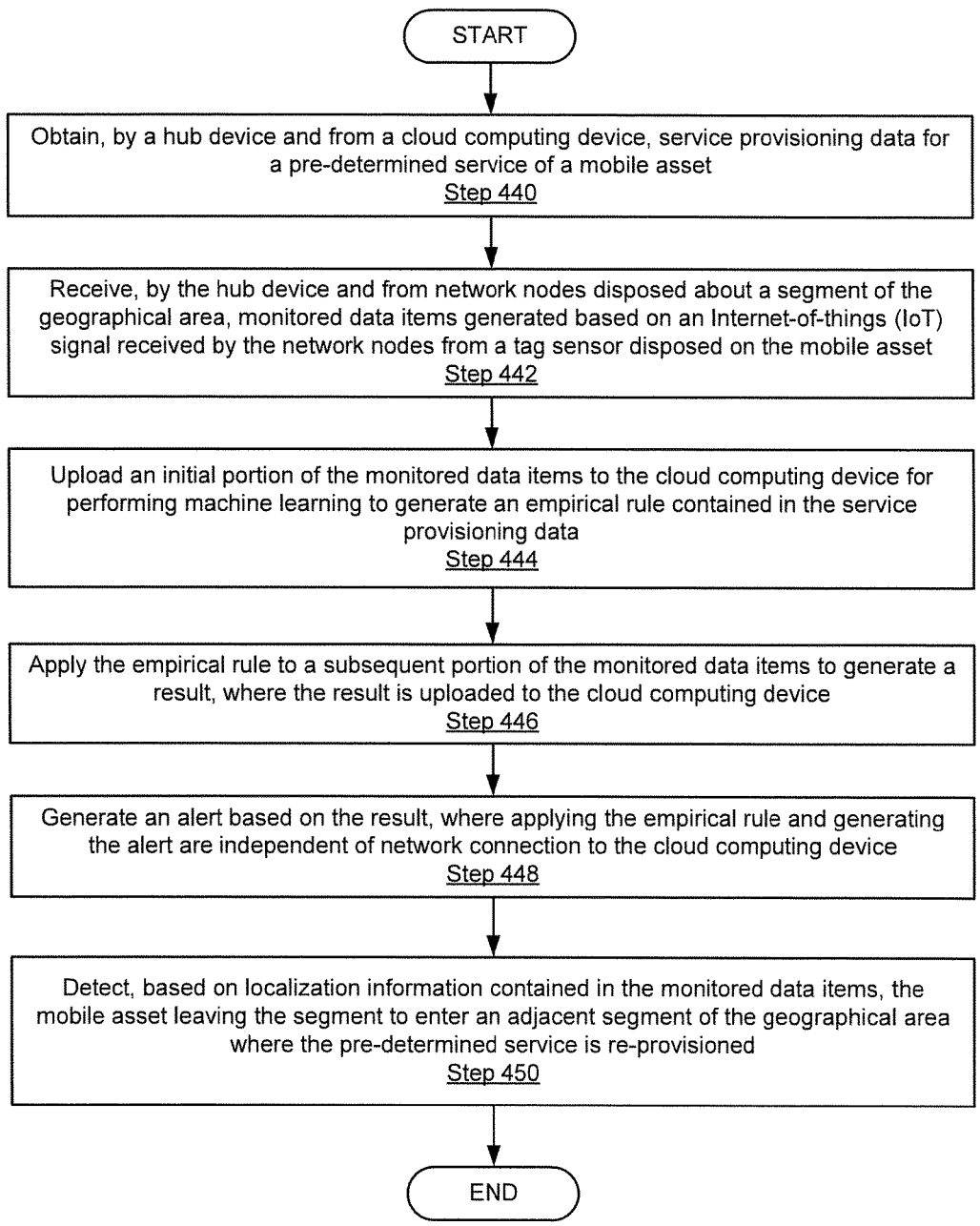

FIG. 4D shows a flow chart of a method for monitoring an object in a geographical area using the hub and cloud platform depicted in FIGS. 1E-1G above. Initially in Step 440, service provisioning data for a pre-determined service of the mobile asset is obtained by a hub device from a cloud computing device.

In Step 442, monitored data items are received by the hub device from network nodes disposed about a first segment of the geographical area. In particular, the monitored data items are generated based on an Internet-of-things (IoT) signal received by the network nodes from a tag sensor disposed on the mobile asset. Accordingly, in Steps 444-450 below, the monitored data items are processed based on the service provisioning data to provide the pre-determined service of the mobile asset across the first segment. In one or more embodiments, the pre-determined service is provided to a user via at least a user application. In one or more embodiments, providing the pre-determined service includes providing user access to the monitored data items.

In Step 444, an initial portion of the monitored data items is uploaded by the hub device to the cloud computing device prior to the hub device receiving an empirical rule as part of the service provision data. In one or more embodiments, the extent of the initial portion of the monitored data for uploading is determined based on network connection to the cloud computing device. For example, more extensive portion of the monitored data is uploaded if stable network connection is available with sufficient bandwidth and/or speed. In another example, a reduced portion of the monitored data is uploaded if network connection is unstable or with insufficient bandwidth and/or speed. Based at least on the initial portion of the monitored data items uploaded to the cloud computing device, the empirical rule is generated by the cloud computing device performing machine learning. In other words, the cloud computing device analyzes the uploaded monitored data items using machine learning techniques to generate the empirical rule. An example of Step 444 is shown in FIG. 5C below. As depicted in FIG. 5C, the full data set (501) may include the initial portion of the monitored data items uploaded from one or more hubs, such as the hub (210). The rule templates (503) may include the empirical rule that is generated based on the deep learning (502) using the full data set (501) as the training data set.

In Step 446, the empirical rule is applied to a subsequent portion of the monitored data items by the hub device to generate a result. In one or more embodiments, the result is uploaded to the cloud computing device to supplement, or otherwise be included in, the training data set. In response to supplementing the training data set, the cloud computing device updates the empirical rule based at least on the result. An example of Step 446 is shown in FIG. 5C below. As depicted in FIG. 5C, the rule execution (505) corresponds to applying the empirical rule where partial data set (504) corresponds to the subsequent portion of the monitored data items. Accordingly, the alerts (506) include the result of applying the empirical rule.

In Step 448, in response to applying the empirical rule, an alert is generated applying the empirical rule and generating the alert are independent of network connection between the hub device and the cloud computing device. In other words, the hub device may apply the empirical rule and generate the alert while the network connection is unreliable, disrupted, or not available.

In Step 450, based on localization information contained in the monitored data items, the mobile asset is detected by the hub device as leaving the first segment to enter a second segment of the geographical area. For example, the detection may be a result of applying the empirical rule. In response to detecting mobile asset moves from the first segment into the second segment, the pre-determined service is re-provisioned for the second segment of the geographical area.

Figure 4E:
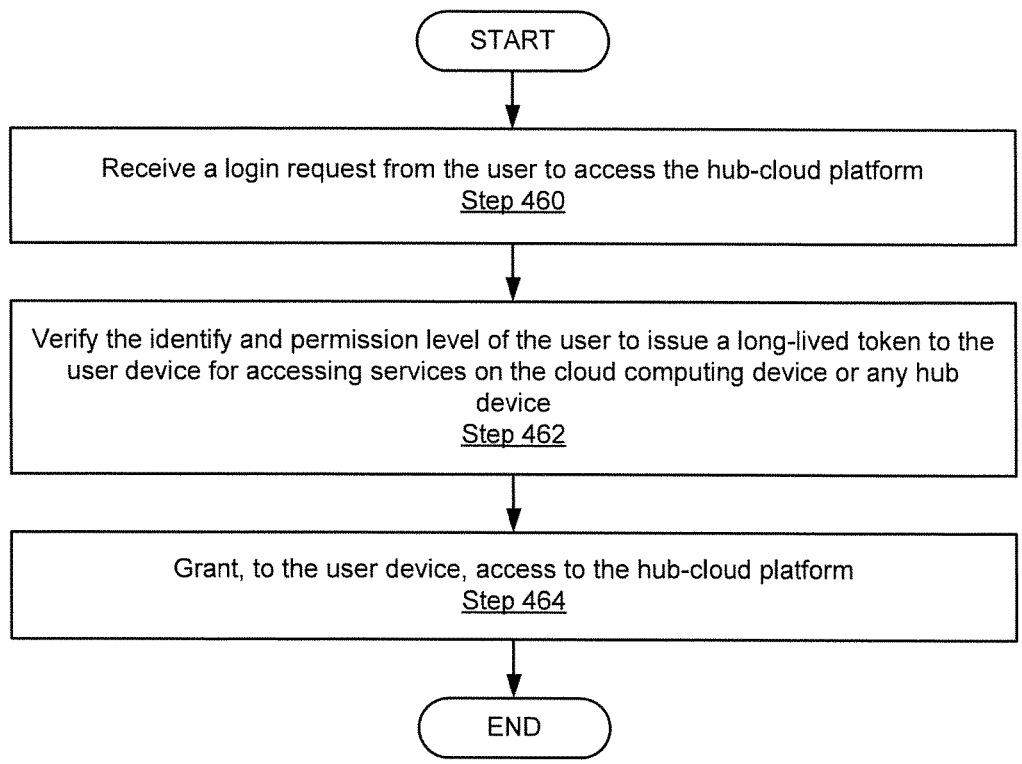

FIG. 4E shows details of Step 412, depicted in FIG. 4A above. Initially, in Step 460, a login request is received from the user to access the hub-cloud platform. This login request may be submitted by the user from any Internet connection, not just the Internet connection at the hub site. In Step 462, through one of many authentication protocols, the identity and permission level of the user is verified to issue a long-lived token to the user device for accessing services on the cloud computing device or on any hub device. As used herein, the term "long-lived" refers to having a validity period exceeding a pre-determined time period, such as an hour, a day, a week, a month, etc. In one or more embodiments, the cloud computing device verifies the user's identity and issues the long-lived token, which is trusted by the cloud computing device and the hub device. In one or more embodiments, the long-lived token is an identity token that does not contain any permissions. The user application or browser executing on the user device stores this long-lived token for future use. In Step 464, subsequent to issuing the long-lived token, the access to the hub-cloud platform is granted to the user device.

In one or more embodiments, the user attempts to access the hub-cloud platform by providing the previously-issued identity token. The service verifies the identity token, and issues a short-lived permissions token. As used herein, the term "short-lived" refers to having a validity period less than the aforementioned pre-determined time period, such as an hour, a day, a week, a month, etc. If the short-lived permissions token is issued by the service executing on the cloud, this token is valid for both hub and cloud. If the short-lived permissions token is issued by the service executing on the hub, this token is only valid for the hub. The permissions token contains the permissions for each service the user has access to, at the time of issuance. This information is stored separately, and is part of the provisioning information that synchronizes between the hub device and the cloud computing device when the permissions are modified.

In one or more embodiments, the user provides the permissions token, or both the permissions and identity tokens, to the desired service when requesting access. The service checks the token(s) and grants access if the user has the required permissions.

In one or more embodiments, when the hub is offline, the permissions token may be issued by the hub based on verifying that the identity token to be valid. In one or more embodiments, the hub is restricted, or otherwise prevented from, issuing identity tokens. Accordingly, when a hub is compromised, the compromised data is limited to the data stored on the hub, since hub-issued tokens are not presumed as trusted by the cloud.

In one or more embodiments, the cloud is provided the functionality to validate cloud-issued identity and permissions tokens. In one or more embodiments, the hub is provided the functionality to validate cloud-issued or hub-issued permissions tokens, and to validate cloud-issued identity tokens. In one or more embodiments, to change permissions, the permissions token is revoked and the permissions database changed; the change takes effect once it expires (after a short period of time). In one or more embodiments, to revoke access, the identity and permissions tokens are revoked and the permissions removed from the database; the identity token may still be used to identify the client (valid for a long time). However, without permissions, the identity token may not be used to access any services.

An example of granting user access using the method of FIG. 4E is described in reference to FIG. 5B below.

IoT networks are typically designed for dense populations in cities where thousands or millions of devices exist and multiple overlapping networks are the norm. Processing is pushed to "the cloud" to keep the devices simple, using high scale data center computing to aggregate, store, and analyze the data from every device. This also has a significant cost advantage, as processing power and storage is typically cheaper when provisioned in large units in the data center, versus having many moderately powered end devices. In many ways, the design of IoT networks stresses the first 'I'—the things in the system must be constantly connected to the Internet.

An IoT network may also provide value away from cities in the rural environments of farms and ranches, or remote oil, gas, and mining operations. These cases differ from the city case because the availability of backhaul to the Internet is much lower, fewer service providers cover the area, bandwidths are lower, latencies are higher, and the networks are less reliable—leading to the typical solution being completely unsuitable for this case. Without a consistent, reliable connection to the Internet, IoT devices operate with a significantly reduced user experience or in some cases, not at all.

The hub-cloud platform is designed specifically for this situation; by locating a hub close to the devices themselves, good performance with high reliability can be provided, even in cases of slow or unreliable backup. Devices communicate over the local IoT network to the hub instead of the cloud, without needing to use the backhaul link to the Internet. The hub is fully synchronized with the cloud, ensuring an equivalent level of service is available while optimizing the use of the backhaul link and is reliability and performance characteristics.

Figure 5A:
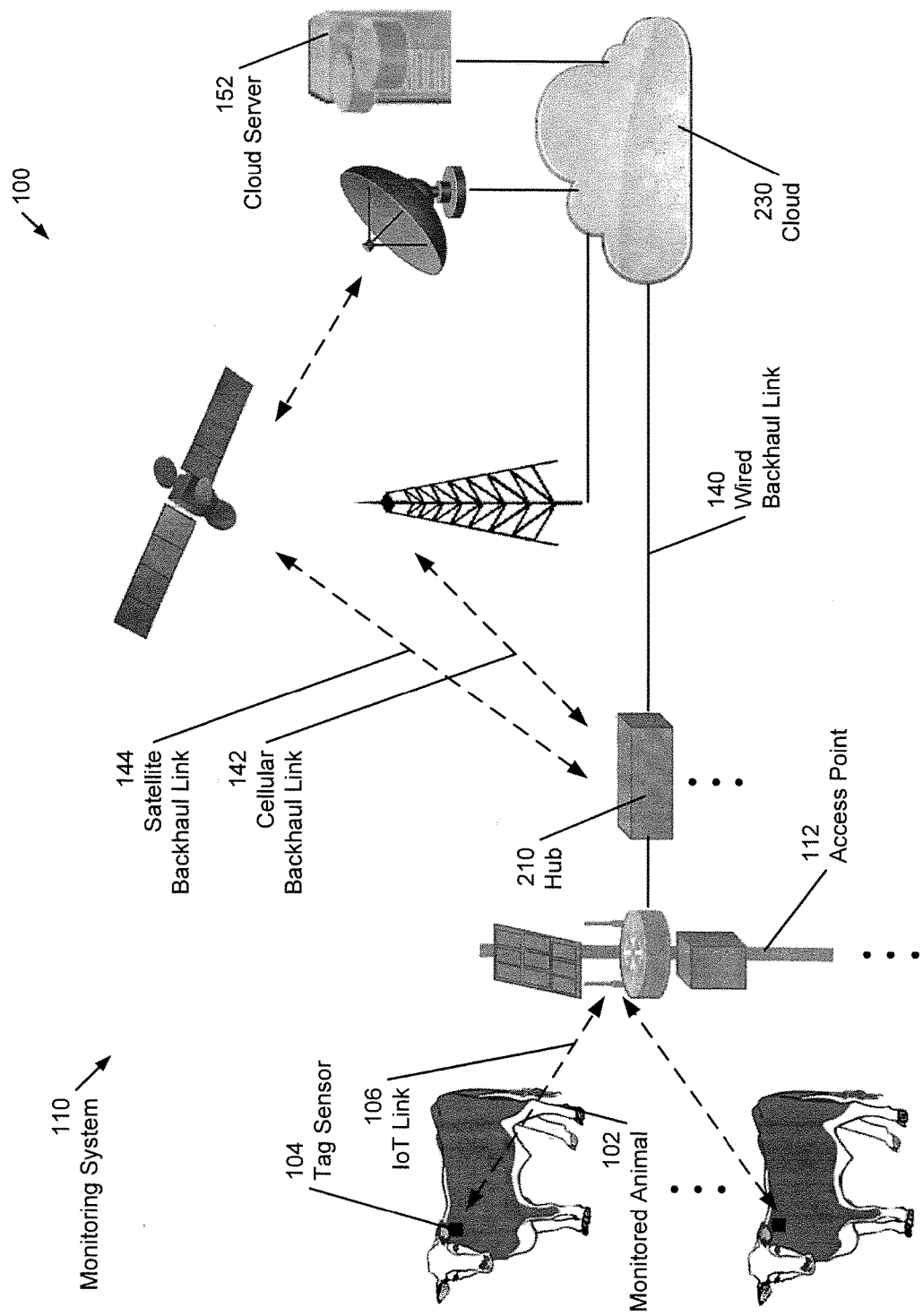
FIGS. 5A, 5B, 5C, and 5D show an example of a system for monitoring an object, in accordance with one or more embodiments of the invention.
Figure 5B:
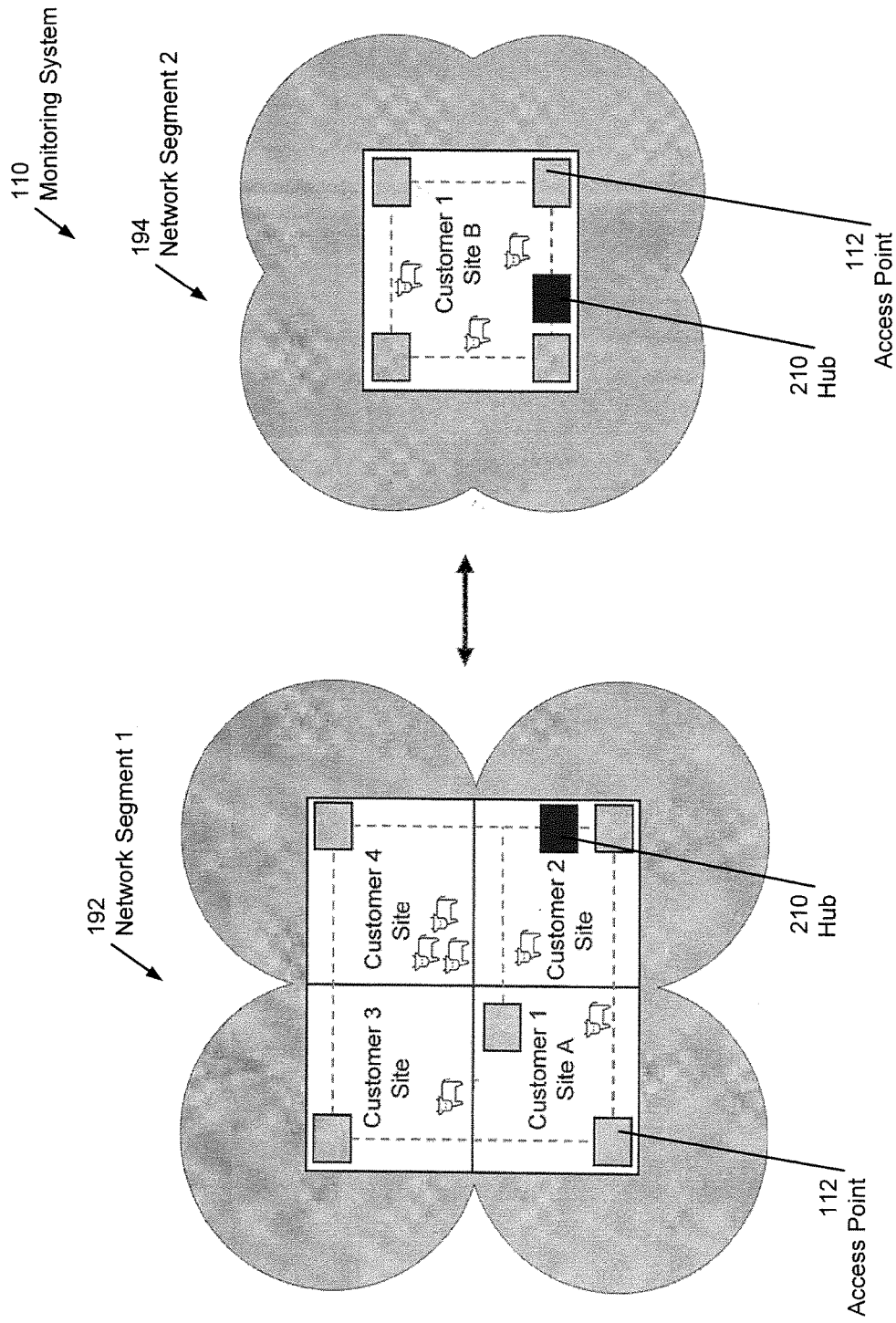
Figure 5C:
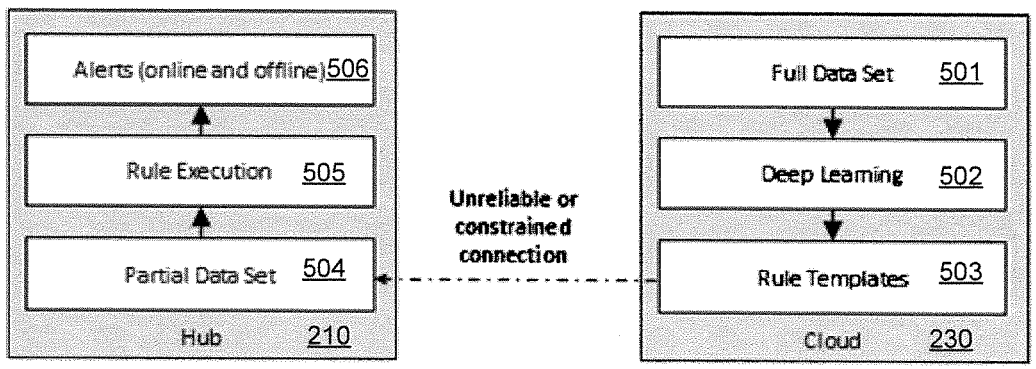
Figure 6:
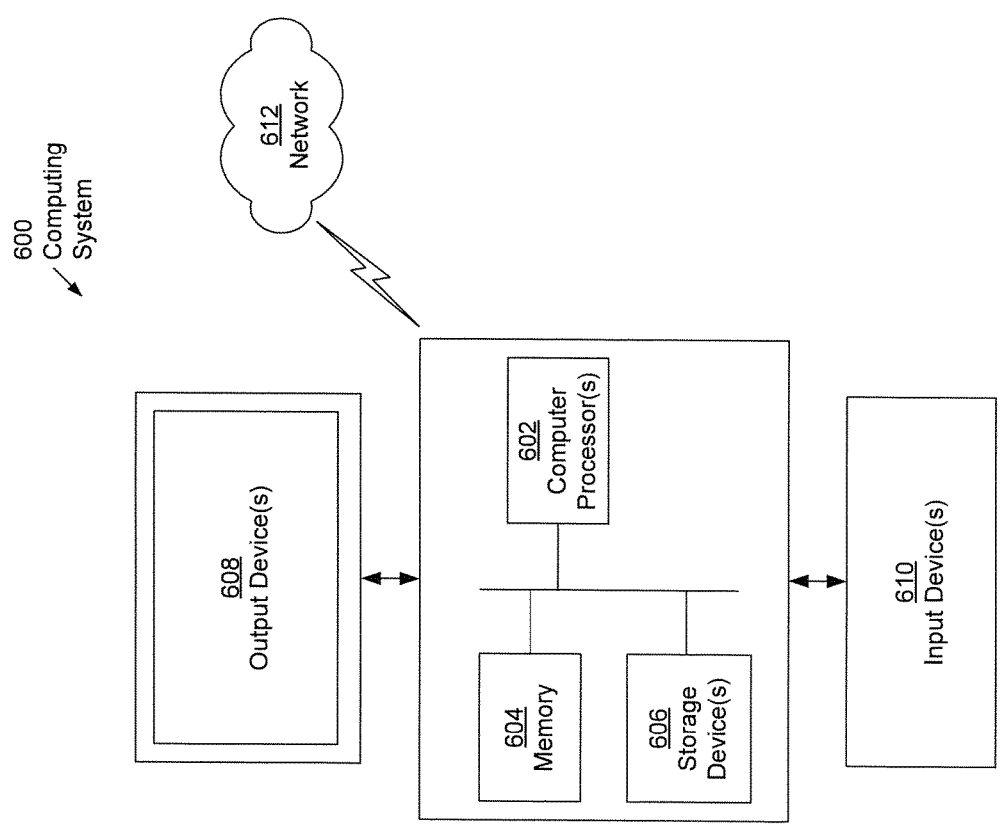
FIG. 6 shows a computing system in accordance with one or more embodiments of the invention.

The following examples described in FIGS. 5A-5B illustrate one of many applications of embodiments of the invention described above. The invention is not meant to be limited to the following examples of monitoring an asset.

FIG. 5A shows an example of the monitoring system (110), depicted in FIG. 1A above, in accordance with one or more embodiments of the invention. In particular, FIG. 5A shows a monitoring system (110) for monitoring livestock raised in a farming environment, depicted as the geographical area (100). The farming environment may include farmland used to raise cattle, sheep, goats, or any other type of animal over a large area, such as hundreds of acres, thousands of acres, etc. In the description of FIG. 5A, the monitored animal corresponds to the mobile asset depicted in FIG. 1A above. Each monitored animal (102) is equipped with a tag sensor (104) that communicates with a network node (112) to enable monitoring of the animals. In the example shown in FIG. 5A, the network node (112) is an access point configured to communicate with the tag sensors (104) of the monitored animals (102) via an Internet of Things (IoT) link (106). The access point (i.e., network node (112)) may further interface with a hub (210), which may perform processing of the data received from the monitored animals via multiple access points including the network node (112). The IoT links (e.g., IoT link (106)) between the monitored animals and access points for an IoT network. In one or more embodiments of the invention, data gathered from the animals via the IoT network is uploaded to a cloud environment (150), from where they may be accessible to users. Additionally or alternatively, the data may also be locally accessible via the hub or via the access point.

Accordingly, to enable energy efficient location determination in certain regions, access points may be strategically placed to have overlapping coverage regions of the IoT network, thereby not requiring the use of power consuming GPS positioning. In regions where TDOA based location services are desired, a dense grid of access points with a high degree of IoT network overlap may be installed to ensure that overlapping coverage is provided by at least three access points, whereas a sparse grid of access points may be installed in other regions. In these other regions, less accurate RSSI positioning may be used, or if an accurate location is required, GPS positioning may be used.

Further as shown in FIG. 5A, various options for interfacing the hub (210) with the computing devices in the cloud (230), e.g., using the Internet, are illustrated, in accordance with one or more embodiments of the invention. A wired backhaul uplink (140), a cellular backhaul uplink (142) and/or a satellite backhaul uplink may be used to interface the hub (210) with a cloud computing device, e.g., the cloud server (152). Alternatively, any other data connection, including any kind of point-to-point or multipoint connection that is at least temporarily available may be used as a backhaul link. In one embodiment of the invention, no backhaul link is used, i.e., the hub (210) is operating without an interface to the cloud (230), and therefore may only be accessed using local computing devices accessing the hub (210) via the access point (112), as previously described with reference to FIG. 1G. Alternatively, in one embodiment of the invention, no hub is used, i.e., the access point(s) may be directly connected to the backhaul link. Such a configuration may be suitable if the backhaul link is considered very reliable. Alternatively, if the backhaul link is considered less reliable, the hub may provide full or at least partial functionality while the cloud is not reachable.

The wired backhaul link (140) may be, for example, a wired Ethernet connection to an Internet service provider, a fiber-optic connection, a DSL Internet connection, a cable Internet connection, etc. Any type of wired data interface suitable to connect the hub to the cloud environment (150) may be used. The cellular backhaul link may be any type of cellular data connection such as a 3G, LTE or 5G data connection. Those skilled in the art will appreciate that any type of wired or wireless data link may be used as a backhaul link, without departing from the invention.

As noted above, the hub (210) and cloud (230) may be configured as a hub-cloud platform, such as the hub-cloud platform (270) depicted in FIGS. 1E and 1F above. The three critical elements of configuring the hub (210) and cloud (230) as the hub-cloud platform are that the system is distributed, consistent, and layered.

The first element is that the hub-cloud platform is distributed. The cloud resides in one or more locations on the public Internet, and is accessible to clients that are connected to the Internet. The hub distributes some of the cloud functions to a particular geographic location (i.e., site) having a set of devices and gateways. This enables the site to operate when disconnected from the Internet, to provide improved performance through lower latency processing, as well as to reduce the load on the cloud/use the cloud only when network bandwidth is ample.

The second element is that the hub-cloud platform is consistent. Components accessing the hub-cloud platform on the hub may anticipate the same behavior as components accessing the hub-cloud platform at the cloud. Some services run only on the hub, and some services run only in the cloud, but where they run in both places they provide the same set of APIs and functions. The hub-cloud platform syncs data between Hub and Cloud to ensure a consistent view of data, in addition to consistent services APIs.

The third element is that the hub-cloud platform is layered. At the base layer is a set of core services, such as data storage, networking, and messaging. Above the base layer is the IoT services layer, which provides services specific to IoT networks, but not to a specific target product. At the very top are mobile asset specific services, which build on the lower layers to provide mobile asset (e.g., agricultural asset) specific features. Additional mobile asset specific services may be added to the top layer to address other market requirements.

FIG. 5B shows an exemplary monitoring system (110) that includes multiple network segments (192, 194), in accordance with one or more embodiments of the invention. Each of the network segments (192, 194), is equipped with a hub (210) and multiple access points (112), providing coverage for the monitoring of livestock. Alternatively, these network segments may be operated without hubs. Further, both network segments operate using the same radio frequency (RF) plan, i.e., using the same transmission protocol and frequencies, as described in reference to FIG. 3 above. Network segment 1 (192) is configured as a multitenant site, i.e., multiple customers are served by the network segment. Consider, for example, a monitoring system (110) that is installed in a rural area by a provider that offers the monitoring of livestock as a service. Multiple ranchers (customers 1-4, as shown in FIG. 5B) sign up for the service and have their animals monitored by the monitoring system. The monitoring system may be publicly or privately operated. The animals may be kept separate (e.g. in fenced separate areas) or they may be kept in a larger combined area. Optionally, the animals may freely move across sites within the area but trigger a notification or an alarm if detected in a location different from the rancher's site, to let the rancher know that animals have left his property. One of the ranchers (customer 1) owns additional land (site B) that is separate from site A. This additional land is also used for raising livestock and is monitored by an additional network segment, i.e., network segment 2. Network segment 2 may or may not use the same RF plan as network segment 1. Because network segments 1 and 2 belong to the same monitoring system, information about devices may be exchanged between the network segments. Accordingly, moving animals from site A to site B is straightforward. The scenario of FIG. 5B thus illustrates a multitenant, multisite monitoring system, in accordance with one or more embodiments of the invention. Those skilled in the art will appreciate that monitoring systems, in accordance with one or more embodiments of the invention, are fully scalable. For example, monitoring systems may include any number of sites, any number of customers and any number of animals being monitored. Further, monitoring systems, in accordance with one or more embodiments of the invention, may be globally distributed. For example, sites A and B may be on different continents. Network segments may grow arbitrarily large, with any number of access points and/or tag sensors or other monitored devices. However, eventually a network segment with numerous devices may become congested, or the hub of the network segment may be overwhelmed by the incoming volume of data. In such a scenario, the network segment may be split into two or more separate network segments, each with its own hub and access points. Although the network segments are shown as disjoint in FIG. 5B, the network segments may also overlap with each other in other configurations.

As depicted in FIG. 5B, the IoT network of the monitoring system (110) may be divided into multiple geographic areas of coverage, each one a segment (e.g., network segment 1 (192), network segment 2 (194)) of the overall IoT network within the geographical area (100). Within each segment (e.g., network segment 1 (192), network segment 2 (194)), the IoT links share the same RF plan (frequencies). Devices (e.g., tag sensors) within the segment are processed at a single point (whether hub or cloud), where transmissions to the devices are coordinated and received information from the device via multiple IoT gateways (e.g., access point (112)) are collapsed into a single receipt. If gateway coverage is dense enough, RSSI and TDOA calculations are performed to give a rough location for the device. Network segments also have a single IoT protocol overlay (if used), with all devices and gateways in the segment transmitting and receiving in sync. That is, each network segment has its own schedule. For example, the network segment 1 (192) and the network segment 2 (194) may have different parameters of the superframe and frames. Within a network segment, devices may move freely without reconfiguration. Devices transitioning to a new network segment must be reconfigured, either to change frequencies (RF plan), to change IoT protocol overlay schedule, or both. This may typically be performed without changing the security The size of an individual network segment is largely driven by the number of devices it services and the amount of data transmitted via the IoT network. More devices and more data means a higher proportion of the airtime is consumed within the network segment. Because the segment operates in sync across all gateways, the entire segment bears the load of each device. Once a large proportion of the airtime within a segment is used or reserved, the segment is split into adjoining or stacked segments to reduce the coverage area, access additional frequencies, or to split the IoT overlay schedule into multiple schedules.

In addition, network segments assigned to a hub may run out of processing capacity for the network backend. In this case, splitting the network segment (e.g., into the network segment 1 (192) and network segment 2 (194)) allows the load to be split between hubs (e.g., multiple hubs (118)). Network segments assigned to the cloud typically do not have this issue, as the processing capacity is much greater at the cloud.

Network segments (e.g., network segment 1 (192), network segment 2 (194)) are assigned to be served by either a hub (e.g., hub (210)) or the cloud, depending on the reliability and capacity of the backhaul link, as described in reference to FIGS. 1G and 5A above.

As discussed earlier, the primary driver for deploying a hub is network connectivity. A secondary benefit of deploying a hub is a reduction in load on the cloud. As the hub is performing all of the necessary cloud functions directly and locally, the cloud does not need to perform these operations. Network segments may be connected directly to the Internet through two primary methods. For example, a primary gateway may be connected to the Internet and the other gateways connected via the mesh to the primary gateway. In another example, each gateway may be connected individually to the Internet. A hybrid of the two examples is also possible.

A single network segment may support multiple customers over multiple sites, such as denoted as customer 1 site A, customer 2 site, customer 3 site, customer 4 site within the network segment 1 (192). A site is a geographic boundary (e.g., the property line of a particular customer) that delineates a customer's area of interest. Generally, each site is covered by a single network segment, to facilitate easy movement of devices within the site. The devices may move between sites within a single network segment without reconfiguration. However, this may result in an alarm to the customer owning the device, as it has left his or her property boundary.

Sites also form the basis for provisioning services for a network segment. For example, the data used by a hub to offer services for the network segment may be provisioned. Specifically, the IoT network is used to provide end user services. These services are generally specific to individual customers and individual customer sites for addressing predefined conditions such as an animal falling sick, an animal leaving the property. To support these services offline, the hub may be provisioned with the data for each customer within the network segment. To provision a hub to serve the network service, the hub may look up the sites within the network segment it processes, locate the corresponding customer data, and synchronize it for offline use. Accordingly, the hub may be deployed whenever there is an unreliable or constrained network connection to process the information from the IoT devices on its network segment during an offline condition.

In addition, the hub may also optimize the backhaul connection(s) in the following ways:
Compression: Compress data to/from the cloud server to reduce bandwidth required.
Prioritization: Sync high-priority data before lower-priority data.
Selective synchronization: Skip syncing data not required by the cloud, or sync certain information on demand (e.g., logs).
Data acknowledgement: Retry synchronization until data is confirmed on the cloud.
Multipath support: Use multipath protocols supporting bandwidth aggregation (for faster performance) or handover (for reliability).
Batching: Synchronize (selected or all) data only when a sufficient amount is available, or during specified time windows.

In summary, these features allow the IoT system to be more conservative of network resources than IoT devices individually are.

Although the hub is capable of operating a network segment offline, hub may not provide an identical set of services than what the cloud provides. There are a number of situations where the cloud is better suited to perform the task, and the hub operates in a degraded or alternate way when the cloud is not accessible. An example of this is the global device database. During manufacturing, the device information (e.g., ID, security keys, etc. of each tag sensor) are registered with the cloud, rather than each hub individually. The device information may exist within the cloud indefinitely, and may be downloaded to a hub when the device is assigned to a site within a network segment of a hub. If the hub is offline when the device is assigned to the site, the hub will synchronize the device data upon connecting to the network subsequently. The device would be unusable on that segment until the device data synchronization.

To support the user application of the hub-cloud platform (e.g., user application (250) of the hub-cloud platform (270) depicted in FIG. 1E above), the hub does not issue authentication tokens for security reasons, such as to prevent cyber attacks and ensure that the client and server (i.e., user devices and cloud computing devices) mutually authenticate each other using public key certificates. To log in to access the hub-cloud platform, the user submits a login request to the cloud. Through one of many authentication protocols, the cloud verifies the client identity and issues a long-lived token to access services on the cloud or on any hub. The user application or browser stores this long-lived token for future use. This login request may be performed from any Internet connection, not just the Internet connection at the hub site.

Unlike typical authentication tokens, the token issued by the cloud is "long-lived," i.e., it is valid for multiple days or weeks. This ensures that the user has a valid credential even if the device or the hub is offline for a long time, and is chosen to be longer than expected periods of network downtime (e.g., 1 week). The hub may validate the token even when offline, and even for users it has not encountered before, by verifying that the cryptographic signature on the token matches a known certificate of the cloud. While the hub is online, the token is periodically refreshed to extend the token into the future. If the token expires, the user needs to login again.

The user is also assigned a set of permissions governing which data elements are accessible. For example, the set of permissions ensures that one customer cannot see another customer's data, or a junior employee cannot access the full functionality of the system.

As offline hubs may only check the authenticity and scheduled expiry of a token, the token remains valid until the expiry date if a user is removed from the hub-cloud platform. To maintain security with long-lived tokens, permissions are not stored within the security token, but stored and synchronized to the hub separately from the token. In this manner, when a user is removed, the user's permissions are initially removed from the cloud. Prior to the permission being synchronized to the hub, the hub continues to authenticate the user without permitting user access to any services. Should a hub be offline during removal of the user, the user retains access to the data stored locally on the hub with the same level of permissions as before, until the token expires or the hub synchronizes with the cloud, whichever occurs first.

FIG. 5C shows a block diagram of an example analytics system that is distributed between the hub (210) and the cloud (230) described in reference to FIG. 1E above. As shown in FIG. 5C, the cloud (230) is configured to store the full data set (501), perform deep learning (502), and generate the rule templates (503). The hub (210) is configured to store a partial data set (504), perform rule execution (505), and generate alerts (506). The full data set (501) includes various data uploaded from the hubs, including but not limited to the hub (210), as well data provided by users. In contrast, the partial data set (504) includes local data of the hub (210), e.g., obtained from the devices in the network segment of the hub (210), as well as downloaded from the cloud (230). The deep learning (502) is a machine learning software module that performs deep structured machine learning or hierarchical machine learning using, e.g., a deep neural network, deep belief network, recurrent neural network, etc. The rule templates (503) is a collection of empirical rules generated by the deep learning (502). The rule templates (503) may include multiple portions each applicable to one of the hubs that covers a particular network segment. The rule execution (505) is a software module that applies an empirical rule downloaded from the cloud (230) to generated the alerts (506), which are messages to notify the user of occurrence of predefined events.

The aforementioned system elements of the hub (210) and cloud (230) form the analytics system that is responsible for triggering alerts (506) on predefined events (e.g., animal out of property, power system not charging), as well as perform deep learning (502) for determining the appropriate setting values for a network segments to reduce false positives/negatives and to compensate for differences in hardware, propagation characteristics, dead zones, etc. associated with devices in network segments.

Alerts (506) function while the hub is online and offline, and therefore is located on the hub (210) of the hub-cloud platform. However, machine learning and other statistical techniques often require large volumes of data storage (e.g., storing the full data set (501)) and significant computing resources more than what is available to an individual hub. Therefore, as depicted in FIG. 5C, the hub-cloud platform assigns the machine learning (deep learning) (502) and execution functions (e.g., to generate rule templates (503)) of the analytics system to be performed within the cloud (230), which in turn pushes rule templates (503) down to the hub (210) for rule execution (505) and limited (shallow) learning based on a partial data set (504). As used herein, the full data set (501) is data uploaded to the cloud (230) from multiple hubs (e.g., hub (210)) the partial data set (504) is local data stored in the hub (210), e.g., including data obtained from devices (e.g., tag sensors) covered by the network segment of the hub (210).

To provide consistent APIs and a consistent view of a site's data, the hub-cloud platform contains a distributed object store for storing the full data set (501) and multiple partial data sets (e.g., partial data set (504)) of hubs in the monitoring system. The object store associates each stored partial data set with a site and synchronization behavior that may be site-specific, and automatically synchronizes data between the hub and cloud. In particular, each partial data set (e.g., partial data set (504)) stored on the hub is a subset of the full data set (501) stored in the cloud (230) Each partial data set (e.g., partial data set (504)) is synchronized only for the specific sites within the hub's network segment, and is also time-bound to limit the storage needed on the hub. This mechanism also provides redundancy and data recovery. While the cloud typically stores the data in multiple locations and multiple nodes to ensure redundancy, the hub needs only to store the data once. Should the hub fail and a new hub be assigned to the network segment, the new hub will provision itself from the cloud, downloading the appropriate data for the sites it services.

The object store synchronization mechanism also supports priority, ensuring that important data has access to the backhaul network before lower priority data. For instance, synchronizing the user permissions table is highly important and is synchronized as soon as possible, while synchronizing statistical data for later analysis is of lower importance and may wait as long as necessary.

On the hub, a single instance of each hub-cloud service is run. As all the services share the same hardware, running multiple instances consumes extra resources and does not improve reliability or performance. In contrast, on the cloud, multiple instances provide an increase in reliability and performance by distributing load between multiple physical machines. To facilitate this, the hub-cloud platform uses message queues and unique ID-based topics for gateways, network segments, sites, and devices so that multiple services may process the queue, or that multiple services may distribute the gateways/access points between themselves.

Where it is advantageous to process all of the data from a component in a single service instance (e.g., due to the service reducing multiple messages into a single message, as in an IoT packet received by multiple gateways/access points, or due to the service maintaining a history), the hub-cloud platform may use consistent hash ring to ensure messages from a device, a gateway/access point, a customer, or a site are all assigned to the same instance. This prevents excessive thrashing of data when creating additional service instances for distributing the load, or removing extra service instances for collating the load.

Devices (e.g., tag sensors) leaving a network segment and appearing on a different network segment, even if owned by the same customer (e.g., customer 1 depicted in FIG. 5B), require a different set of network settings to communicate with the IoT network. This is because the new network segment may have a different RF plan and IoT protocol overlay schedule. Being within the overall IoT network, the hub (210) on the network segment 2 (194) may request information on the new device from the cloud in order to provision the new device. Alternatively, the new device or the hub (210) on the network segment 1 (192) may proactively inform the hub (210) on the network segment 2 (194) of the incoming device before it leaves the network segment 1 (192).

As the cloud contains all of the device information, transfer between two network segments managed by the cloud requires no synchronization. However, the device still has to change RF plan and be inserted into the new network segment's IoT protocol overlay schedule.

Figure 5D:
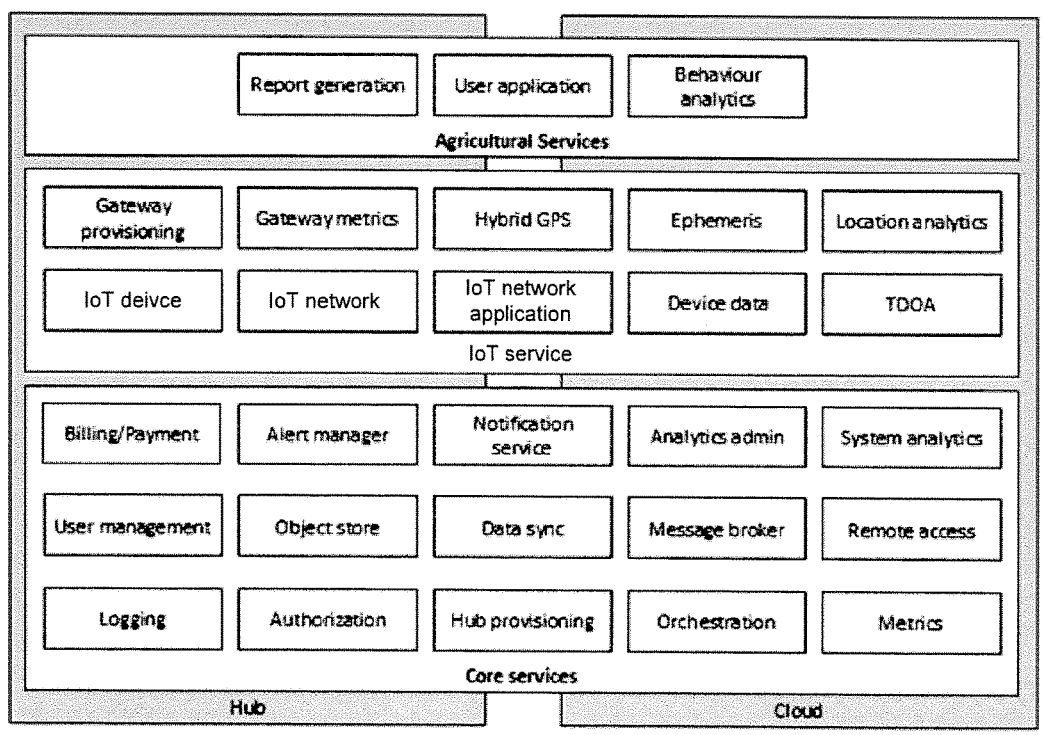

FIG. 5D shows an example of layered services provided by the hub-cloud platform. For example, the core services may include, but is not limited to:
Hub provisioning: Provisions a hub to offload a specific set of cloud services
Service Authorization: Authorization for services
User Management: Authentication, authorization, and permissions management for users
Service Orchestration: Ensures that all necessary services are running and scaled appropriately
Service Metrics: Monitors service health metrics
Software update: Provides software updates to hub and cloud services
Object store: Stores typed service/application data
Data sync: Synchronizes data between Hub and Cloud
Message broker: Messaging system for communicating between services
Remote access: Remote diagnostic subsystem
Logging: Storage, rotation, and synchronization system for service logs
Alert Manager: Stores user-addressable alerts
Notification service: Notifies users on alerts
Analytics administration: Administers analytics services
System analytics: Generates alerts on system issues
Billing/payment: Charge accounts for service
Further, IoT services may include, but is not limited to:
Gateway provisioning: Provisions a gateway to broadcast a specific network segment
Gateway metrics: Transforms gateway metrics into service metrics
IoT Device: Provisions IoT devices on to the network, and stores security credentials
IoT Network: Routes to/from the IoT network gateways and the appropriate IoT Network Application service
IoT Network Application: Encrypts and decrypts IoT device data, and schedules transmissions according to the IoT Protocol Overlay
Hybrid GPS: Decodes hybrid GPS messages into latitude/longitude coordinates
Ephemeris: Downloads GPS system ephemeris data from the Gateways or the Internet
Time Delay of Arrival: Generates IoT device location based on transmission timing
Location Analytics: Generates boundary violation and movement alerts
Device Data: Stores IoT device data and locations
In addition, Agricultural services may include, but is not limited to:
Analytics report generation: Generates reports based on data stored within system
User Application: Stores agricultural records and exposes IoT system data to user application
Behavior Analytics: Generates alerts on animal health and other agricultural conditions In addition to the layering of the services within the hub-cloud platform, the data itself is also layered. As data flows throughout the hub-cloud platform, components along the path may augment the data with additional metadata, without decrypting or decoding the data from the component(s) before.

For instance, a device transmitting a data flow may include, but is not limited to, the following:
The device transmits the original encrypted payload
Each receiving gateway may add metadata on the frequency and time received
The IoT network server may add metadata on the number of gateways receiving
The TDOA service may add metadata on the location of the transmitting device, based on the earlier metadata
The device data service may record in the database, adding metadata for associated site and customer
The sync service may add metadata on the sync time and priority By adding this metadata to the existing payload without modification, the hub-cloud platform may process data from any IoT network and of any type, while apply extensions with the necessary data to add its unique benefits.

FIG. 6 shows a computing system in accordance with one or more embodiments of the invention. Embodiments of the invention may be implemented on a computing system. Any combination of mobile, desktop, server, embedded, or other types of hardware may be used. For example, as shown in FIG. 6, the computing system (600) may include one or more computer processor(s) (302), associated memory (304) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (302) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (312) (e.g., a local area network (LAN), a wide area network (WAN) such as the Internet, mobile network, or any other type of network) via a network interface connection (not shown). The input and output device(s) may be locally or remotely (e.g., via the network (312)) connected to the computer processor(s) (302), memory (304), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the invention.

Further, one or more elements of the aforementioned computing system (600) may be located at a remote location and connected to the other elements over a network (312). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Embodiments of the invention may enable, for example, the implementation of geo-fencing functionalities to prevent escape or to detect proximity to hazardous features such as cliffs. Embodiments of the invention may further enable the detection of regular use (or failure to use) feed or water locations, rapid movements (resulting, e.g., from a predator attack), and/or failure to move (resulting, e.g., from injury). Further additional behaviors may be detected using additional sensors. For example, an accelerometer may be used to detect head motion that is characteristic for eating and drinking. Physiological variables may be monitored, including temperature, heart rate, blood pressure and digestive activity to monitor animal health. Alerts may be triggered when any one or combinations of measurements are beyond a specified range, thus enabling early detection of threats, diseases and other anomalies.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for monitoring an object in a geographical area, comprising:
    obtaining, from a cloud computing device, service provisioning data for a pre-determined service of the object;
    receiving, from a first plurality of network nodes disposed about a first segment of the geographical area, a plurality of monitored data items,
        wherein the plurality of monitored data items are generated based on an Internet-of-things (IoT) signal received by the first plurality of network nodes from a tag sensor disposed on the object; and
    processing, based on the service provisioning data, the plurality of monitored data items to provide the pre-determined service of the object across the first segment of the geographical area,
    wherein the IoT signal comprises a repeating pattern of superframes, each superframe comprising a plurality of frames, wherein the repeating pattern of superframes defines rules for data exchange in the form of frequency bands and time slots for wireless data communication between one of the first plurality of network nodes and the tag sensor.

2. The method of claim 1, further comprising:
    applying an empirical rule to a first portion of the plurality of monitored data items to generate a result,
    wherein the service provision data comprises the empirical rule that is generated by the cloud computing device performing machine learning based at least on a second portion of the plurality of monitored data items.

3. The method of claim 2, further comprising:
    uploading the second portion of the plurality of monitored data items to the cloud computing device for performing the machine learning; and
    uploading the result to the cloud computing device, wherein the cloud computing device updates the empirical rule based at least on the result.

4. The method of claim 3, further comprising:
    generating, in response to applying the empirical rule, an alert based on the result,
    wherein applying the empirical rule and generating the alert are independent of network connection to the cloud computing device.

5. The method of claim 1, further comprising:
    detecting, based on localization information contained in the plurality of monitored data items, a mobile asset leaving the first segment to enter a second segment of the geographical area; and
    re-provisioning, in response to the detecting, the pre-determined service for the second segment of the geographical area,
    wherein the object comprises the mobile asset.

6. The method of claim 5, wherein re-provisioning the pre-determined service comprises:
    reconfiguring the tag sensor to transmit the IoT signal based on an IoT communication setting of the second segment,
    wherein the IoT signal is received by a second plurality of network nodes disposed about the second segment based on the IoT communication setting of the second segment, and
    wherein the IoT signal is received by the first plurality of network nodes based on the IoT communication setting of the first segment.

7. The method of claim 5,
    wherein the service provisioning data is obtained from a cloud computing device by a first hub device,
    wherein the plurality of monitored data items are received from the first plurality of network nodes by the first hub device, and
    wherein re-provisioning the pre-determined service comprises:
        providing, by the first hub device, the service provisioning data to a second hub device serving the second segment.

8. The method of claim 7,
wherein the pre-determined service is provided to a user via a user application accessing an application service of at least one device selected from a group consisting of the cloud computing device and the first hub device.

9. The method of claim 8, wherein accessing the application service comprises:
submitting, using the user application, a login request to the at least one device;
obtaining, from the at least one device, a long-lived token to access the application service, wherein the long lived token is generated by the at least one device verifying an identity of the user based on a pre-determined authentication protocol; and
storing the long-lived token by the user application for subsequent login into the at least one device,
wherein access to the application service is granted based on the at least one device checking permission level of the long-lived token.

10. The method of claim 8,
wherein the application service provides data, to the user application, that is synchronized between the cloud computing device and the first hub device based on at least one selected from a group consisting of an importance measure of the data, a speed of a communication link coupling the cloud computing device and the first hub device, and an empirical rule that is generated by the cloud computing device performing machine learning based at least on a portion of the plurality of monitored data items.

11. The method of claim 3, wherein uploading the second portion of the plurality of monitored data items comprises determining an extent of the second portion based on availability of network connection to the cloud computing device.

12. A hub device for monitoring an object in a geographical area, comprising:
a computer processor; and
memory storing instructions, when executed, causing the computer processor to:
obtain, from a cloud computing device, service provisioning data for a pre-determined service of the object;
receive, from a first plurality of network nodes disposed about a first segment of the geographical area, a plurality of monitored data items,
wherein the plurality of monitored data items are generated based on an Internet-of-things (IoT) signal received by the first plurality of network nodes from a tag sensor disposed on the object; and
process, based on the service provisioning data, the plurality of monitored data items to provide the pre-determined service of the object across the first segment of the geographical area,
wherein the IoT signal comprises a repeating pattern of superframes, each superframe comprising a plurality of frames, wherein the repeating pattern of superframes defines rules for data exchange in the form of frequency bands and time slots for wireless data communication between one of the first plurality of network nodes and the tag sensor.

13. The hub device of claim 12, the instructions, when executed, further causing the computer processor to:
apply an empirical rule to a first portion of the plurality of monitored data items to generate a result,
wherein the service provision data comprises the empirical rule that is generated by the cloud computing device performing machine learning based at least on a second portion of the plurality of monitored data items.

14. The hub device of claim 13, the instructions, when executed, further causing the computer processor to:
upload the second portion of the plurality of monitored data items to the cloud computing device for performing the machine learning; and
upload the result to the cloud computing device, wherein the cloud computing device updates the empirical rule based at least on the result.

15. The hub device of claim 14, the instructions, when executed, further causing the computer processor to:
generate, in response to applying the empirical rule, an alert based on the result,
wherein applying the empirical rule and generating the alert are independent of network connection to the cloud computing device.

16. The hub device of claim 12, the instructions, when executed, further causing the computer processor to:
transform the plurality of monitored data items prior to at least one selected from a group consisting of: storing the plurality of monitored data items on the hub device and uploading the plurality of monitored data items to a cloud device.

17. The hub device of claim 12, the instructions, when executed, further causing the computer processor to:
detect, based on localization information contained in the plurality of monitored data items, a mobile asset leaving the first segment to enter a second segment of the geographical area; and
re-provision, in response to the detecting, the pre-determined service for the second segment of the geographical area,
wherein the object comprises the mobile asset.

18. The hub device of claim 17, wherein re-provisioning the pre-determined service comprises:
reconfiguring the tag sensor to transmit the IoT signal based on an IoT communication setting of the second segment,
wherein the IoT signal is received by a second plurality of network nodes disposed about the second segment based on the IoT communication setting of the second segment, and
wherein the IoT signal is received by the first plurality of network nodes based on the IoT communication setting of the first segment.

19. The hub device of claim 17, wherein re-provisioning the pre-determined service comprises:
providing the service provisioning data to a second hub device serving the second segment.

20. A non-transitory computer readable medium storing instructions for monitoring an object in a geographical area, the instructions, when executed, causing a computer processor to:
obtain, from a cloud computing device, service provisioning data for a pre-determined service of the object;
receive, a plurality of network nodes disposed about a segment of the geographical area, a plurality of monitored data items, wherein the plurality of monitored data items are generated based on an Internet-of-things (IoT) signal received by the plurality of network nodes from a tag sensor disposed on the object; and
process, based on the service provisioning data, the plurality of monitored data items to provide the pre-determined service of the object across the segment of the geographical area, wherein the IoT signal comprises a repeating pattern of superframes, each superframe comprising a plurality of frames, wherein the repeating pattern of superframes defines rules for data exchange in the form of frequency bands and time slots for wireless data communication between one of the first plurality of network nodes and the tag sensor.

21. The non-transitory computer readable medium of claim 20, the instructions, when executed, further causing the computer processor to:
apply an empirical rule to a first portion of the plurality of monitored data items to generate a result,
wherein the service provision data comprises the empirical rule that is generated by the cloud computing device performing machine learning based at least on a second portion of the plurality of monitored data items.

22. The non-transitory computer readable medium of claim 21, the instructions, when executed, further causing the computer processor to:
upload the second portion of the plurality of monitored data items to the cloud computing device for performing the machine learning; and
upload the result to the cloud computing device, wherein the cloud computing device updates the empirical rule based at least on the result.

23. The non-transitory computer readable medium of claim 20, wherein the instructions are executed solely by the cloud computing device or by an intervening hub device between the cloud computing device and the plurality of network nodes.

24. The method of claim 1, further comprising:
detecting, by the cloud computing device based on localization information contained in the plurality of monitored data items, a mobile asset leaving the first segment to enter a second segment of the geographical area; and
re-provisioning, by the cloud computing device in response to the detecting, the pre-determined service for the second segment of the geographical area,
wherein the object comprises the mobile asset.

* * * * *